United States Patent
Stathacopoulos et al.

(10) Patent No.: US 10,171,880 B2
(45) Date of Patent: Jan. 1, 2019

(54) SYSTEMS AND METHODS FOR MODELING AUDIENCE STABILITY OF A MEDIA ASSET SERIES

(71) Applicant: Rovi Guides, Inc., San Carlos, CA (US)

(72) Inventors: Paul Stathacopoulos, San Carlos, CA (US); Benjamin H. Maughan, Pleasanton, CA (US); Sean Matthews, Los Altos, CA (US)

(73) Assignee: Rovi Guides, Inc., San Jose, CA (US)

( * ) Notice: Subject to any disclaimer, the term of this patent is extended or adjusted under 35 U.S.C. 154(b) by 34 days.

(21) Appl. No.: 15/391,416

(22) Filed: Dec. 27, 2016

(65) Prior Publication Data

US 2018/0184170 A1    Jun. 28, 2018

(51) Int. Cl.
*H04N 21/475* (2011.01)
*H04N 21/25* (2011.01)
*H04N 21/81* (2011.01)
*H04N 21/258* (2011.01)
*G06Q 10/06* (2012.01)
*G06Q 10/10* (2012.01)
*G06Q 30/02* (2012.01)
*H04N 21/482* (2011.01)

(52) U.S. Cl.
CPC ......... *H04N 21/4756* (2013.01); *G06Q 10/06* (2013.01); *G06Q 10/10* (2013.01); *G06Q 30/0201* (2013.01); *G06Q 30/0202* (2013.01); *G06Q 30/0241* (2013.01); *G06Q 30/0282* (2013.01); *H04N 21/252* (2013.01); *H04N 21/25858* (2013.01); *H04N 21/812* (2013.01); *H04N 21/4821* (2013.01)

(58) Field of Classification Search
CPC ............ H04N 21/4756; H04N 21/252; H04N 21/25858; H04N 21/812
See application file for complete search history.

(56) References Cited

U.S. PATENT DOCUMENTS

| 5,872,588 | A | * | 2/1999 | Aras | H04N 7/17354 |
| | | | | | 348/E7.075 |
| 8,255,949 | B1 | | 8/2012 | Bayer et al. | |
| 8,561,108 | B2 | * | 10/2013 | Bhogal | H04N 7/17318 |
| | | | | | 386/296 |

(Continued)

FOREIGN PATENT DOCUMENTS

WO    WO 00/65422    11/2000

*Primary Examiner* — Alexander Q Huerta
(74) *Attorney, Agent, or Firm* — Haley Guiliano LLP

(57) ABSTRACT

Systems and methods are described for modeling the consistency of audiences viewing groups of media assets. For example, a media guidance application (e.g., executed on a server) may identify a first subset of user equipment that generated for display a first media asset (e.g., an episode of a series). The media guidance application may then identify a second subset of the first subset where the user equipment generated for display another media asset that is part of a group of media assets (e.g., another episode of the same series). Based on the number of user equipment in the second subset, the media guidance application may calculate a score for audience consistency for the group of media assets (e.g., the series) which can be used to rank the group of media assets among other groups of media assets.

20 Claims, 13 Drawing Sheets

(56) References Cited

U.S. PATENT DOCUMENTS

| | | | |
|---|---|---|---|
| 8,984,547 B2 * | 3/2015 | Lambert | H04H 60/45 725/10 |
| 2002/0010919 A1 * | 1/2002 | Lu | H04H 60/37 725/18 |
| 2002/0056087 A1 * | 5/2002 | Berezowski | G06Q 30/02 725/9 |
| 2004/0019463 A1 | 1/2004 | Kolessar et al. | |
| 2010/0004977 A1 * | 1/2010 | Marci | G06Q 10/10 705/7.32 |
| 2010/0211439 A1 * | 8/2010 | Marci | G06Q 10/10 705/7.29 |
| 2013/0111510 A1 * | 5/2013 | Baker | H04N 21/44204 725/13 |
| 2013/0247081 A1 * | 9/2013 | Vinson | H04N 21/44204 725/14 |
| 2013/0262181 A1 * | 10/2013 | Topchy | G06Q 30/0202 705/7.31 |
| 2014/0013343 A1 | 1/2014 | Bovenschulte et al. | |
| 2016/0381419 A1 * | 12/2016 | Zhang | G06F 3/01 725/14 |
| 2017/0295404 A1 * | 10/2017 | Meredith | H04N 21/4667 |
| 2018/0020251 A1 * | 1/2018 | Hull | H04N 21/252 |

\* cited by examiner

SYSTEMS AND METHODS FOR MODELING AUDIENCE STABILITY OF A MEDIA ASSET SERIES

BACKGROUND

Due to the plethora of media assets available to modern consumers, content providers have a large number of advertising slots to fill with promotional content. Content providers sell these advertising slots to promotional content providers and vary the price depending on the particular advertising slot. As consumers of particular media assets are not of a monolithic demographic makeup, various models have been presented to target promotions to particular groups of viewers. For example, some systems in the related art are designed to provide promotions to display during media assets identified as commonly viewed by a certain demographic group (e.g., teens). Content providers accordingly may charge more for an advertising slot based on the model for the demographics of the users viewing the program.

However, in addition to the composition of an audience, repetitive viewing of a promotion is also important to promotional content providers. Recent market research has shown that consumers are not likely to act on promotional content unless the consumers are repeatedly exposed to the same promotional content a threshold number of times. Thus, even though the systems in the related art may successfully target an advertisement to an appropriate demographic, the targeted advertisement may not lead many users to take a desired action unless the same individual users are repeatedly targeted.

SUMMARY

Accordingly, systems and methods are described herein for modeling the consistency of audiences viewing groups of media assets. For example, in an effort to better monetize advertising slots, a media content provider may determine that particular groups of media assets have a high number of consistent viewers. As one example, a media content provider may determine that many of the viewers of a series (e.g., "Game of Thrones") consistently view episodes of the series (e.g., the viewers tune in for every new episode). Based on determining that the audience includes many consistent viewers, a media content provider may set prices for advertising slots during the series (e.g., "Game of Thrones") higher than prices for advertising slots for other series that have fewer consistent viewers, because exposing the same viewers to advertisements repeatedly is more likely to cause viewers to act on the advertisement.

These systems and methods may be implemented by a media guidance application (e.g., executed by a server), which may receive a data packet (e.g., log file) from a user equipment (e.g., set-top box) containing information on a media asset generated for display by the user equipment (e.g., episode 3 of season 2 of "Game of Thrones"). The media guidance application may then determine whether the user equipment has generated for display another media asset (e.g., episode 4 of season 2 of "Game of Thrones") that is part of a group of media assets (e.g., the series "Game of Thrones"). Based on determining a number of user equipment that have generated for display multiple media assets in the group of media assets, as opposed to other user equipment that have not generated for display multiple media assets in the group of media assets, the media guidance application assigns a score for the media asset. The media guidance application then ranks the groups of media assets based on the scores and may determine the value of advertising slots based on the ranking.

In some aspects, the media guidance application may receive a data packet from a user equipment of a plurality of user equipment. For example, the media guidance application may receive a data packet containing a field including an identifier for a media asset that the user equipment is generating for display. In some embodiments, the media guidance application may receive data packets continuously (e.g., streamed) from user equipment to provide continual updates on the media asset being generated for display by the user equipment. In other embodiments, the media guidance application may receive data packets periodically from user equipment to provide updates on any media assets that were generated for display by the user equipment after the previous transmission.

The media guidance application may extract, from the data packet, an indication of a first media asset generated for display by the user equipment from which the data packet is received. For example, the media guidance application may extract, by executing an SQL script utilizing the declarative "Select" command, the indication of the first media asset generated for display from a field in a table transmitted in the data packet. The indication of the first media asset may be any identifying metadata related to the media asset, such as the title of the media asset or a unique program identifier assigned by a content provider. For example, the media guidance application may extract the string, "And Now His Watch Is Ended" as the identifier, which identifies a particular episode of the series "Game of Thrones."

In some embodiments, the media guidance application may extract, from the data packet from the user equipment, a progress point and a specific identifier for the user equipment. For example, the media guidance application may extract, by executing an SQL script utilizing the declarative "Select" command, the specific identifier and the progress point from fields in a table transmitted in the data packet. The specific identifier may be any combination of alphanumeric characters that are specific to each user equipment. As a specific example, the media guidance application may extract specific identifier, "STB_145950." The media guidance application may determine the progress point by extracting and comparing fields in the table for start time and end time that a program was generated for display. As a specific example, the media guidance application may extract that the episode "And Now His Watch Is Ended" was generated for display from 21:00 to 21:45. The media guidance application may subtract the start value from the end value and determine the progress point as 45 minutes of the episode, because that is the length that was generated for display. In some embodiments, the media guidance application may use the total time the media asset was generated for display as the progress point, which may be in discrete segments. For example, the media guidance application may determine (e.g., from a received data packet) that "And Now His Watch is Ended" was generated for display from 21:00 to 21:21 and from 21:40-21:50. In this example, the media guidance application may determine the total time (e.g., 31 minutes) that the user equipment generated the media asset for display and store that value as the progress point.

In some embodiments, the media guidance application may use the progress point to calculate the percentage of the total program viewed. The media guidance application may determine the total duration of the episode by accessing a media guidance database and retrieving the total duration of the media asset from a field in the database. For example, the media guidance application may retrieve from a field in an entry for the media asset that the total duration of the episode is one hour. The media guidance application may then calculate the percentage of the media asset generated for display by the user equipment by dividing the progress point by the retrieved total duration. For example, the media guidance application may determine the percentage as 75% of the episode that has been generated for display by the user equipment. The media guidance application may then store, in an entry of a viewing history database for the user equipment identified by the specific identifier, the percentage of the first media asset generated for display. For example, the viewing history database may contain a plurality of entries that correspond to each media asset generated for display by the user equipment during a timeframe. The media guidance application may maintain viewing history databases for each of a plurality of user equipment and use the data contained in each when generating a model for audience consistency.

The media guidance application may identify a first subset of the plurality of user equipment, the first subset comprising each user equipment from which the first media asset was generated for display for a first threshold portion of a total duration of the first media asset. For example, the media guidance application may execute a program script which iterates through each viewing history database corresponding to a particular user equipment based on an index viewing history data structure in order to identify the first subset. The index viewing history data structure may be organized as an array where each index of the array contains a pointer to a viewing history database for a user equipment. The media guidance application may iterate through each row of the array and determine whether each user equipment generated the first media asset for display. For each user equipment the media guidance application determines generated the first media asset for display, the media guidance application retrieves a value from a field in the index viewing history data structure for the progress point, as discussed above. The media guidance application then determines whether the user equipment generated the first media asset for display the threshold portion of the total duration. For example, the media guidance application may determine based on a progress point (e.g., 30 minutes) exceeds a threshold portion of the total duration (e.g., 10 minutes). The media guidance application may store a list of the specific identifiers of user equipment that the media guidance application determined generated the first media asset for display the first threshold portion (i.e., the first subset).

In some embodiments, the media guidance application may access a threshold database containing a plurality of threshold portions. For example, the media guidance application may access the threshold database stored locally in memory or remotely at a media guidance data source via a communications path. The threshold database may be organized as a table where each entry contains a particular threshold portion and fields of the entry contain characteristics associated with the particular threshold. The media guidance application may compare a characteristic of the first media asset with the plurality of threshold portions to identify the first threshold portion that corresponds to the first media asset. For example, the media guidance application may determine that the first media asset is of the type, "television show" based on metadata associated with the first media asset retrieved from a media guidance data source. The media guidance application may then determine whether any field in the threshold database contains the characteristic "television show" (e.g., based on character comparison of the two strings). In response to determining that the characteristics match, the media guidance application may retrieve the threshold portion associated with the characteristic (e.g., 5 minutes).

The media guidance application may identify a second subset of the first subset, the second subset comprising each user equipment from which a second media asset, that is part of a group of media assets including the first media asset, was generated for display for a second threshold portion of a total duration of the second media asset. For example, the media guidance application may retrieve the stored list containing the user equipment of the first subset and further filter the list based on whether each user equipment on the list generated for display a second media asset that is part of the group of media assets including the first media asset. The group of media assets may be a series (e.g., "Friends"), a time slot (e.g., 7-8 pm), and/or a channel (e.g., FOX). For example, the media guidance application may determine that a particular user equipment that is part of the first subset (e.g., that generated an episode of "Game of Thrones") has not generated any other episodes of "Game of Thrones" and thus the media guidance application may determine that the particular user equipment should not be part of the second subset. The media guidance application repeats this operation for every user equipment that is part of the first subset, e.g., via execution of a for-loop to iteratively check whether each user equipment has generated for display other related media assets.

In some embodiments, the media guidance application may use additional criteria when determining the score for the group of media assets in order to better gauge the composition and viewing habits of repeat viewers. The media guidance application may store an indication of whether each particular user equipment determined to be part of the second subset generated the second media asset for display within a threshold time from the original airdate of the media asset. For example, the media guidance application may store a boolean set to "True" if the user watched the second media asset within 1 hour of the original airdate of the second media asset. In other embodiments, the media guidance application may store an indication of a respective source from which each particular user equipment determined to be part of the second subset generated the second media asset for display. For example, the media guidance application may store a string set to "VOD" if the user watched the second media asset from a video-on-demand source. In another embodiment, the media guidance application may store an indication of a respective device type of each particular user equipment determined to be part of the second subset. For example, the media guidance application may store a string set to "Mobile Phone" if the user watched the second media asset from a mobile phone. In this way, the media guidance application may use the additional value(s) as a factor when determining the score for audience consistency for a group of media assets. For example, if a greater number of repeat users watch a particular media asset on a set-top box as opposed to on a mobile phone, a higher score may be generated.

The media guidance application may determine whether a second media asset stored in the viewing history database for each user equipment is part of a series by comparing metadata of the second media asset with metadata identifying the media assets in the series. For example, the media guidance application may determine that "Hardhome" is another episode of the series "Game of Thrones." As described above, the media guidance application may then determine whether the user equipment generated the second media asset for display a threshold amount of time. The media guidance application may store a second list of the specific identifiers of user equipment that the media guidance application determined generated the second media asset, that is part of a group of media assets including the first media asset, for display the second threshold portion (i.e., the second subset). Alternatively, the media guidance application may remove user equipment from the first list that were determined to not be part of the second subset (i.e., user equipment that have not generated a second media asset that is part of a group of media assets including the first media asset a threshold amount of time).

In some embodiments, when determining whether the second media asset is part of a series of media assets including the first media asset, the media guidance application may access an entry in a media guidance database corresponding to the first media asset. For example, the media guidance application may access an entry corresponding to the first media asset in the media guidance database via a communications network. The media guidance application may then compare metadata in the entry with metadata identifying groups of media assets. For example, the entry in the media guidance database for the first media asset may include a group of media assets flag stored in a field, set to true if the first media asset is part of a group of media assets, and another field identifying the group of media assets (e.g., the string, "Game of Thrones"). Alternatively, the media guidance application may compare metadata from the entry for the first media asset (e.g., an actor) with metadata in other entries to determine if the first media asset and another media asset is part of a group of media assets.

The media guidance application may then determine, based on comparing the metadata in the entry with the metadata identifying the groups of media assets, that the first media asset is part of the group of media assets. For example, the media guidance application may determine that the first media asset (e.g., an episode entitled "And Now His Watch Is Ended") is part of the group of media assets (e.g., "Game of Thrones") based on metadata stored in a field in the entry for the first media asset identifying the group of media assets. The media guidance application may then determine, based on an entry in the media guidance database corresponding to the group of media assets, that the second media asset is part of the group of media assets. For example, the media guidance application may access an entry in the media guidance database containing a list of pointers to entries for media assets associated with the group of media assets. The media guidance application may determine by comparing metadata of each linked entry to metadata for the second media asset whether the second media asset is part of the group of media assets.

The media guidance application may calculate a score for audience consistency for the group of media assets based on determining an amount of user equipment in the second subset relative to the amount of user equipment in the first subset. For example, the media guidance application may determine how many user equipment identifiers are present on the list defining the second subset. As a specific example, 100,000 user equipment may be part of the second subset (e.g., each user equipment that has generated for display at least one other episode, in addition to the episode for which the score is being calculated). The media guidance application may also determine the total number of user equipment that generated the first media asset for display the threshold portion (e.g., all user equipment that generated a particular episode for display, including those that have not generated any other episodes for display). As a specific example, 300,000 user equipment may be part of the first subset that generated the media asset for display. The media guidance application may use these values to model the audience consistency for the group of media assets. For example, the media guidance application may calculate that 33% (e.g., 100,000/300,000) of the user equipment generated another media asset in addition to the first media asset for display. The media guidance application may input any combination of these values, such as the absolute number of user equipment that generated another media asset for display in addition to the first media asset (e.g., 100,000), as well as the percentage of user equipment for the first media asset that consistently generate media assets for display that are part of a group of media assets (e.g., 33%) into a mathematical function to determine the score for the group of media assets. In general, the media guidance application will calculate higher scores when the size of the second subset is greater and when the percentage is greater, since this corresponds to a greater number and/or percentage of user equipment consistently generating media assets that are related (e.g., part of a series).

The media guidance application may rank the group of media assets among a plurality of groups of media assets based on the calculated score for audience consistency for the group of media assets. For example, the media guidance application may execute a program script implementing a sorting algorithm commonly known in the art (e.g., merge sort or bubble sort) to rank the group of media assets among a plurality of other groups of media assets. For example, the calculated score for the series, "Game of Thrones" may be 80 out of a possible 100, which the media guidance application may determine results in "Game of Thrones" having the $4^{th}$ highest position on a ranked list for audience consistency.

In some embodiments, the media guidance application may identify a third subset of the plurality of user equipment, the third subset comprising each user equipment from which a third media asset was generated for display for a third threshold portion of a total duration of the third media asset. For example, the media guidance application may determine from data packets received from user equipment that a subset of the user equipment generated for display an episode of "Friends." As discussed above, the media guidance application may then determine whether each user equipment generated the episode of "Friends" for the threshold portion and if so add the specific identifier for the user equipment to a list of user equipment of the third subset.

The media guidance application may then identify a fourth subset of the third subset, the fourth subset comprising each user equipment from which a fourth media asset, that is part of a second group of media assets including the third media asset, was generated for display for a fourth threshold portion of a total duration of the fourth media asset. For example, as discussed above, the media guidance application may determine whether each user equipment on the list defining the third subset also generated for display another media asset that is part of a group of media assets including the third media asset (e.g., a different episode of the series "Friends). As discussed above, the media guidance application may add the specific identifier to a list defining the fourth subset if the fourth media asset was generated for display the threshold portion of the total duration of the fourth media asset.

The media guidance application may then calculate a score for audience consistency for the second group of media assets based on determining an amount of user equipment in the fourth subset. For example, as described with regards to calculating the score for audience consistency for the first group of media assets defined by the second subset, the number of user equipment in the fourth subset (e.g., 50,000) relative to the third subset (e.g., 500,000) may be used to calculate a score for audience consistency.

The media guidance application may then determine whether the score for audience consistency for the second group of media assets is greater than the score for audience consistency for the first group of media assets. For example, the media guidance application may determine that the score for "Game of Thrones" is 80 out of 100 and the score for "Friends" is 30 out of 100. In response to determining that the score for audience consistency for the second group of media assets is greater than the score for audience consistency for the first group of media assets, the media guidance application may rank the second group of media assets higher than the first group of media assets among the plurality of ranked media assets. For example, because "Game of Thrones" has a higher audience consistency score than "Friends," the media guidance application may rank "Game of Thrones" higher.

In some embodiments, the media guidance application continues to analyze each different media asset generated for display by the plurality of user equipment. For example, the media guidance application may execute a program script utilizing a for-loop to determine, for every media asset generated for display by the plurality of user equipment, whether each user equipment also generated for display another media asset that is part of a group of media assets including the first media asset. As a specific example, the media guidance application may generate a score using the methods described above for each episode in a series in order to determine the audience consistency throughout the series (e.g., trends in the audience consistency).

In some embodiments, when calculating a score for audience consistency for the group of media assets, the media guidance application may determine a score for each media asset in the group of media assets. For example, for each media asset of the group of media assets, the media guidance application may determine whether the user equipment previously generated another media asset for display based on accessing the viewing history database for each user equipment, as described above. As a specific example, the media guidance application may determine that for one episode of "Game of Thrones" (e.g., an episode entitled "Hardhome") there were a greater number of user equipment that hadn't generated for display another media asset in "Game of Thrones" than in "And Now His Watch Is Ended" and accordingly assigns different scores to the two episodes.

The media guidance application may then calculate an average score by averaging the score for each media asset in the group of media assets. For example, the media guidance application may determine that the average score for an episode of "Game of Thrones" is 78 out of a possible 100. The media guidance application may then map the average score to the score for audience consistency for the group of media assets by processing the average score with a first mathematical function. For example, the media guidance application may weigh additional factors, such as the number of episodes in the series for which a score was calculated and the distribution of user equipment at different time points in the media asset (e.g., whether after 10 minutes most user equipment stopped generating the media asset for display).

In some embodiments, the media guidance application alternatively or additionally considers the variance (the sum of the difference squared between each media asset score and the average score) when determining the score for audience consistency for the group of media assets. For example, if episode one of a series is substantially above the average and episode two is substantially below, there will be a higher variance than if the two episodes were both close to the average. The media guidance application may map the variance to the score for audience consistency for the group of media assets by processing the variance with a second mathematical function. For example, the media guidance application may assign a lower score based on a calculated higher variance between two series because, while the average audience consistency may be the same in both cases, the higher variance signals a wide variety in the consistency of individual episode audiences.

In some embodiments, the group of media assets is a series and the first and second media assets are episodes of the series, where the episodes are transmitted by a content provider at different times. In this situation, the media guidance application may retrieve a first score for the first episode of the series and a second score for the second episode of the series. For example, the media guidance application may retrieve a score of 85/100 for episode 2 of season 3 of "Game of Thrones" and a score of 55/100 for episode 3 of season 3 of "Game of Thrones." The media guidance application may then determine whether the first score is greater than the second score. For example, the media guidance application may determine whether the score is trending up or down with each subsequent episode in time. As a specific example, because episode 3 of season 3 has a lower score than episode 2 of season 3, the media guidance application may determine that the score is trending down (e.g., the first score is greater than the second score). The media guidance application, in response to determining the first score is greater than the second score, may decrease the score for audience consistency for the series. For example, the media guidance application may weight a trend in the consistency of viewers between episodes when calculating the score for audience consistency for the series, as described above. As a specific example, if there was no trend between episodes, the media guidance application may calculate the score for audience consistency as the average of the episodes scores. If there is a downward trend as discussed, the media guidance application may decrease the score for audience consistency by a factor.

In some embodiments, the media guidance application may identify a third subset of the second subset, the third subset comprising each user equipment from which a third media asset, that is part of the group of media assets including the first media asset and the second media asset, was generated for display for a third threshold portion of a total duration of the third media asset. For example, the media guidance application may determine user equipment that generated for display more than the first and second media asset that are part of the group of media assets. As a specific example, the media guidance application may determine that a particular user equipment viewed 17 episodes of "Game of Thrones."

The media guidance application may then determine an amount of user equipment in the third subset. For example, as discussed for determining the number of user equipment in the second subset, the media guidance application may sum the number of user equipment identifiers stored in the list to determine the number. The media guidance application may then adjust the score for the group of media assets based on a weight for each of the amount of user equipment in the third subset. For example, the media guidance application may determine that because most of the user equipment in the second subset also generated multiple other media assets for display to increase the score for audience consistency for the group of media assets. In some embodiments, the distribution of number of episodes viewed by each user equipment may also be used by the media guidance application when calculating the audience consistency score (e.g., if a large number of user equipment have generated all of the media assets that are part of a group of media assets, the value to an promotional content provider may be greater and the score may be increased as such).

In some embodiments, the media guidance application generates for display a user interface with the ranking of the plurality of groups of media assets with a plurality of selectable options to adjust the score for audience consistency. For example, the media guidance application may generate for display a selectable option to only rank full seasons of groups of media assets (e.g., because a trend mid-season may be too variable to extract statistically significant information relating to audience consistency). The media guidance application may also generate options to average all episodes, weight specific trends higher or lower, and/or to filter the rankings by genre or other category of a group of media assets. The media guidance application may then receive a user selection of an option of the plurality of selectable options. For example, the media guidance application may receive, via a user input interface, a user selection of the option to only rank full seasons of groups of media assets.

The media guidance application may then modify the score for audience consistency for each group of media assets of the plurality of groups of media assets based on the user selection. For example, upon receiving a selection of the option to only rank full seasons, the media guidance application may filter out groups of media assets from the ranking for which a score is not available for each episode of a season. The media guidance application may then rank the plurality of groups of media assets based on the modified score for audience consistency for each group of media assets. For example, the media guidance application may re-rank the groups of media assets based on the modified score.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described for modeling the consistency of audiences viewing groups of media assets. For example, in an effort to better monetize advertising slots, a media content provider may determine that particular groups of media assets have a high number of consistent viewers. As one example, a media content provider may determine that many of the viewers of a series (e.g., "Game of Thrones") consistently view episodes of the series (e.g., the viewers tune in for every new episode). Based on determining that the audience includes many consistent viewers, a media content provider may set prices for advertising slots during the series (e.g., "Game of Thrones") higher than other series that have fewer consistent viewers, because exposing the same viewers to advertisements repeatedly is more likely to cause viewers to act on the advertisement.

These systems and methods may be implemented by a media guidance application (e.g., executed by a server), which may receive a data packet (e.g., log file) from a user equipment (e.g., set-top box) containing information on a media asset generated for display by the user equipment (e.g., episode 3 of season 2 of "Game of Thrones"). The media guidance application may then determine whether the user equipment has generated for display another media asset (e.g., episode 4 of season 2 of "Game of Thrones") that is part of a group of media assets (e.g., the series "Game of Thrones"). Based on determining a number of user equipment that have generated for display multiple media assets in the group of media assets, as opposed to user equipment that have not generated for display multiple media assets in the group of media assets, the media guidance application assigns a score for the media asset. The media guidance application then ranks the groups of media assets based on the scores and may determine the value of advertising slots based on the ranking.

Figure 1:
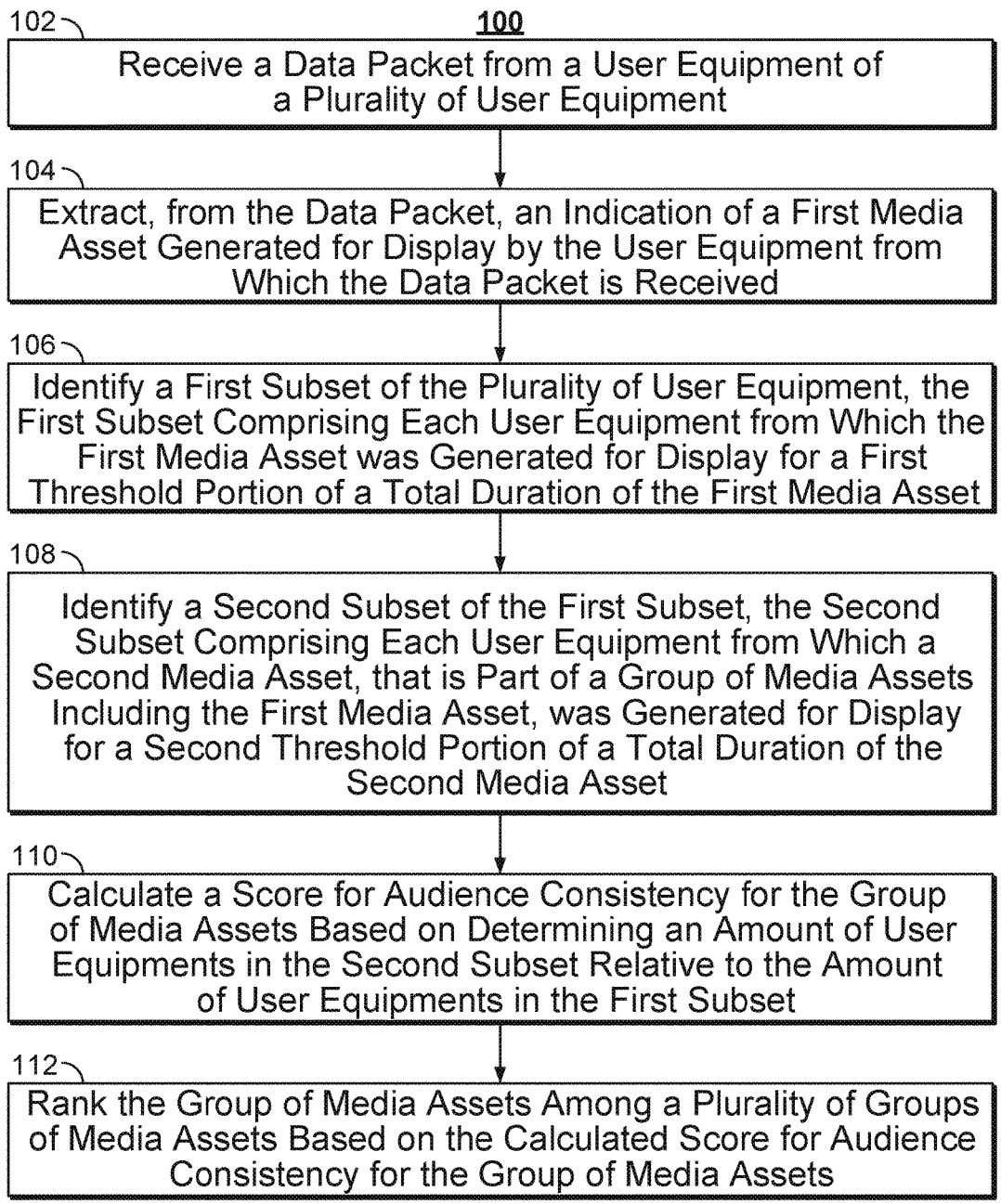
FIG. 1 is a flowchart of illustrative steps for modeling consistency of audiences viewing groups of media assets, in accordance with some embodiments of the disclosure.

FIG. 1 is a flowchart of illustrative steps for modeling consistency of audiences viewing groups of media assets, in accordance with some embodiments of the disclosure. Process 100 begins at 102, where the media guidance application receives a data packet from a user equipment of a plurality of user equipment. For example, the media guidance application may receive a data packet containing a field including an identifier for a media asset that the user equipment is generating for display. Process 100 continues to 104, where the media guidance application extracts, from the data packet, an indication of a first media asset generated for display by the user equipment from which the data packet is received. For example, the media guidance application may extract, by executing an SQL script utilizing the declarative "Select" command, the indication (e.g., the string, "Hardhome" describing an episode from the series "Game of Thrones") of the first media asset generated for display from a field in a table transmitted in the data packet.

Process 100 continues to 106, where the media guidance application identifies a first subset of the plurality of user equipment, the first subset comprising each user equipment from which the first media asset was generated for display for a first threshold portion of a total duration of the first media asset. For example, the media guidance application may determine a list of the specific identifiers of user equipment that generated the first media asset for display the first threshold portion (e.g., all user equipment that generated for display the episode "Hardhome" of the series "Game of Thrones" for 10 minutes or longer) by querying a viewing history database for each user equipment of the plurality of user equipment. Process 100 continues to 108, where the media guidance application identifies a second subset of the first subset, the second subset comprising each user equipment from which a second media asset, that is part of a group of media assets including the first media asset, was generated for display for a second threshold portion of a total duration of the second media asset. For example, the media guidance application may determine a subset of the specific identifiers of user equipment identified as part of the first subset that generated the second media asset for display the first threshold portion (e.g., all user equipment that generated for display "And Now His Watch Is Ended," another episode of "Game of Thrones," for 10 minutes or longer) by querying a viewing history database for each user equipment of the plurality of user equipment that are part of the first subset.

Process 100 continues to 110, where the media guidance application calculates a score for audience consistency for the group of media assets based on determining an amount of user equipment in the second subset relative to the amount of user equipment in the first subset. For example, the media guidance application may determine that 100,000 user equipment are part of the second subset (e.g., the user equipment generated multiple episodes of a series for display) and 300,000 user equipment are part of the first subset. The media guidance application may use these values to model the audience consistency for the group of media assets (e.g., "Game of Thrones") by calculating a score (e.g., 80 out of 100) for the group of media assets based on inputting the values to a mathematical function. As a specific example, the media guidance application may use a linear mapping of the percentage of user equipment that are repeat viewers (e.g., 33% based on 100,000/300,000) and generate a score of 33 out of 100.

As another specific example, the media guidance application may use a non-linear mapping of percentage to score to account for the fact that a percentage over 20% may be an excellent score for a group of media assets and, using this mapping, may calculate a score of 80 out of 100 for the same set of data. For example, the media guidance application may store mathematical functions for different types of media assets (e.g., sports, drama series, or variety show) since different types of media assets may vary in the average percentage that are viewed consistently by the same audience. Specifically, the media guidance application may determine that sports-related media assets generally have a percentage of 20%. If the media guidance application calculates a percentage for a sports-related group of media assets as 50%, this may be considered an excellent audience consistency for that category of media assets. In contrast, the media guidance application may determine that drama series groups of media assets generally have a percentage of 50%, and thus a calculated score for the media asset of 50% would not be as exceptional for audience consistency and would not be assigned as high a score as the sports-related group of media assets despite having the same percentage.

Process 100 continues to process 112, where the media guidance application ranks the group of media assets among a plurality of groups of media assets based on the calculated score for audience consistency for the group of media assets. For example, the calculated score for the series, "Game of Thrones" may be 80 out of a possible 100, which the media guidance application may determine results in "Game of Thrones" having the $4^{th}$ highest position on a ranked list for audience consistency if the scores of other groups of media assets on the ranked list are 10, 30, 90, 95, and 97.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
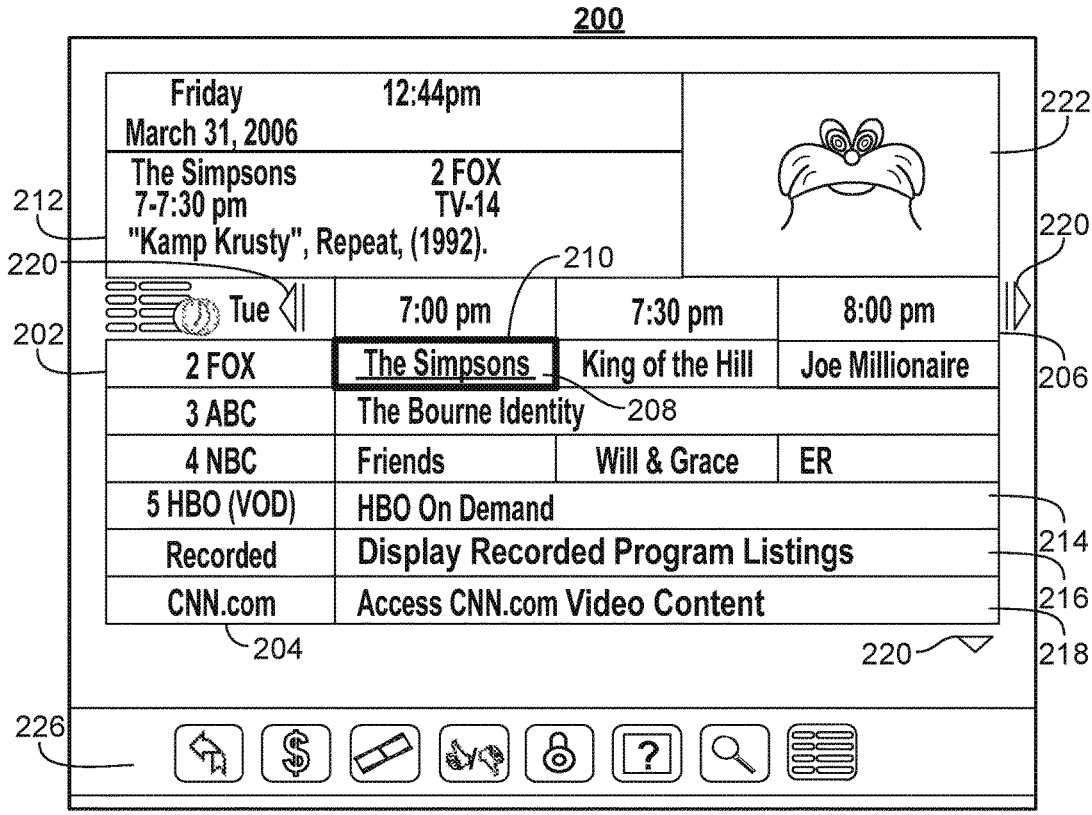
FIG. 2 shows an illustrative example of a display screen for use in accessing media content in accordance with some embodiments of the disclosure.
Figure 3:
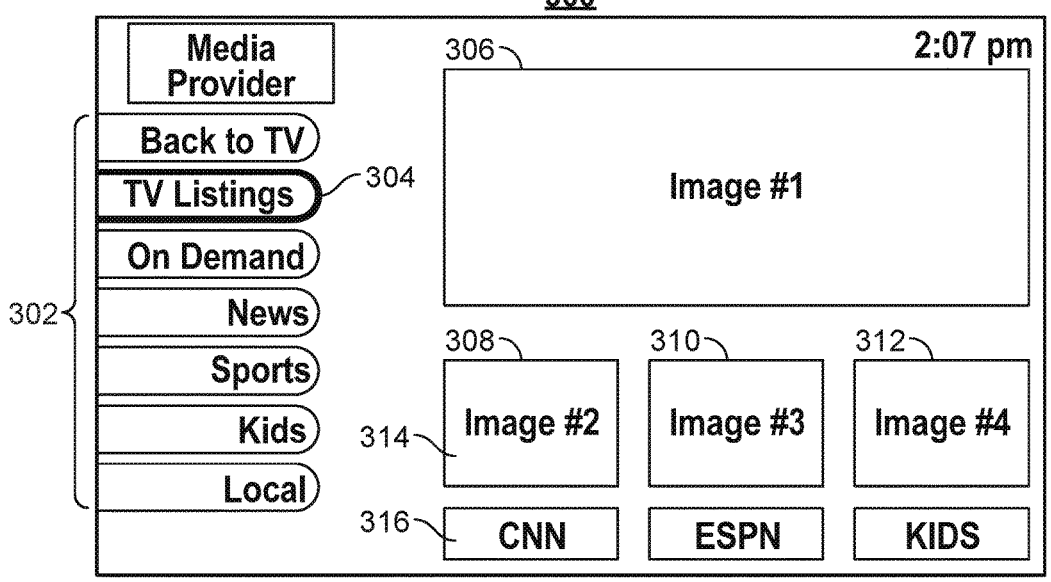
FIG. 3 shows another illustrative example of a display screen used access media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 4:
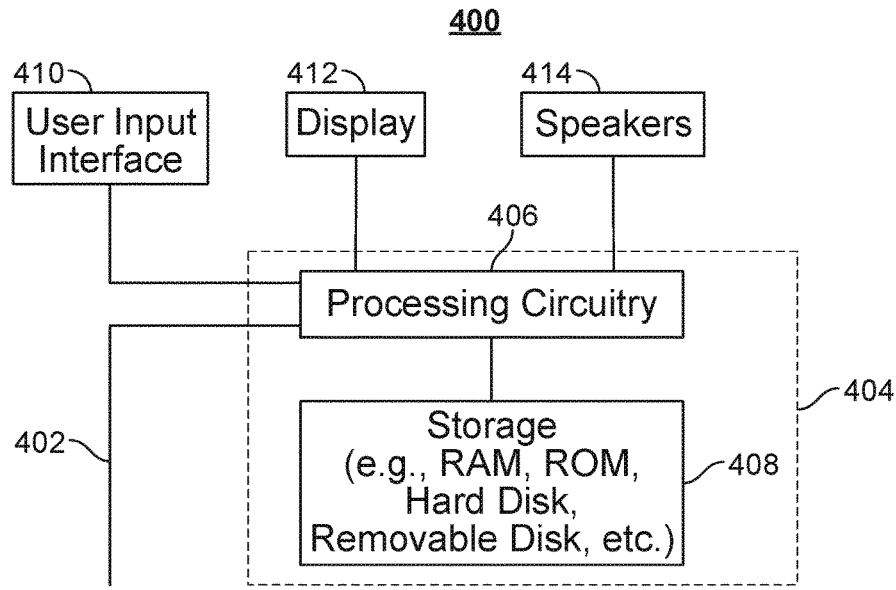
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
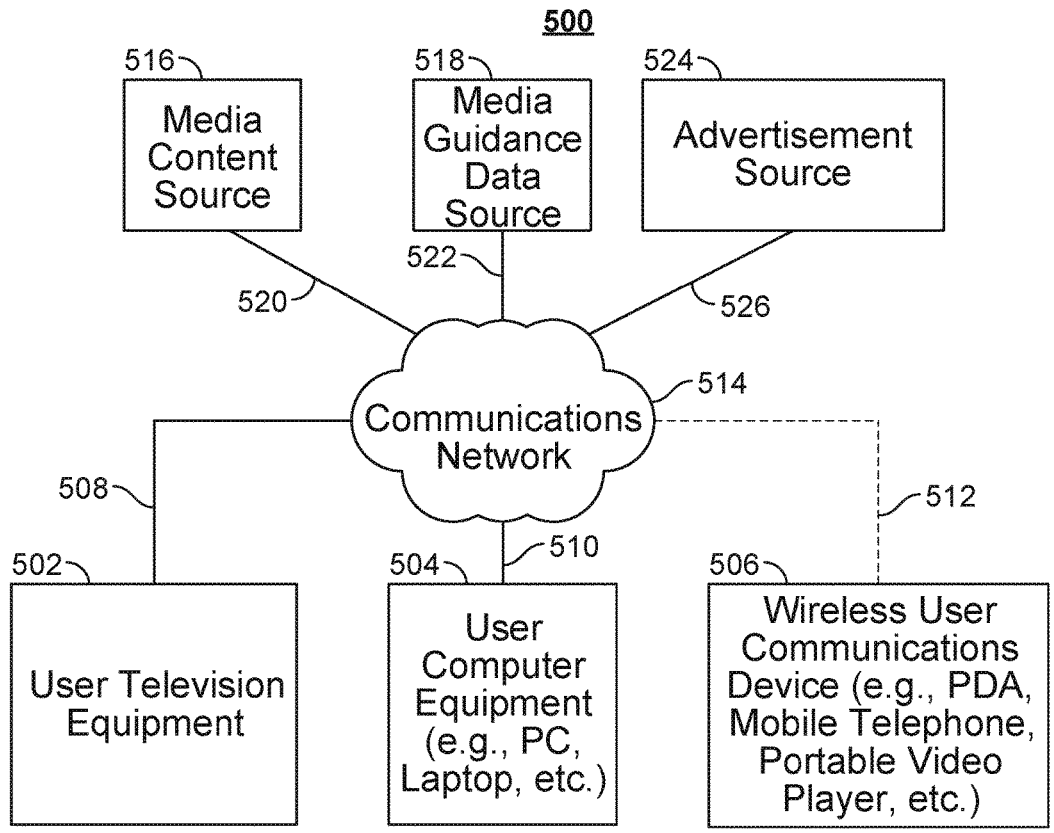
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512.

Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user equipment, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Further expanding on FIG. 1 as discussed above, a media guidance application implementing process 100 may be executed by control circuitry 404 (FIG. 4). It should be noted that process 100 or any step thereof could be performed on, or provided by, any of the devices shown in FIGS. 4-5.

Process 100 begins at 102, where the media guidance application receives (e.g., via control circuitry 404 (FIG. 4)) a data packet from a user equipment (e.g., user equipment 502, 504, and 506) of a plurality of user equipment. For example, the media guidance application may receive (e.g., via control circuitry 404 (FIG. 4)) a data packet containing a field including an identifier for a media asset that the user equipment is generating for display (e.g., on display 412). In some embodiments, the media guidance application may receive (e.g., via control circuitry 404 (FIG. 4)) data packets continuously (e.g., streamed) from user equipment to provide continual updates on the media asset being generated for display by the user equipment. In other embodiments, the media guidance application may receive (e.g., via control circuitry 404 (FIG. 4)) data packets periodically from user equipment to provide updates on any media assets that were generated for display by the user equipment after the previous transmission.

Process 100 continues to 104, where the media guidance application extracts (e.g., via control circuitry 404 (FIG. 4)), from the data packet, an indication of a first media asset generated for display by the user equipment from which the data packet is received. For example, the media guidance application may extract (e.g., via control circuitry 404 (FIG. 4)), by executing an SQL script utilizing the declarative "Select" command, the indication of the first media asset generated for display (e.g., on display 412) from a field in the transmitted data packet. The indication of the first media asset may be any identifying metadata related to the media asset, such as the title of the media asset or a unique program identifier assigned by a content provider. For example, the media guidance application may extract (e.g., via control circuitry 404 (FIG. 4)) the string, "And Now His Watch Is Ended" as the identifier, which identifies a particular episode of the series "Game of Thrones."

Process 100 continues to 106, where the media guidance application identifies (e.g., via control circuitry 404 (FIG. 4)) a first subset of the plurality of user equipment, the first subset comprising each user equipment (e.g., user equipment 502, 504, and 506) from which the first media asset was generated for display (e.g., on display 412) for a first threshold portion of a total duration of the first media asset. For example, the media guidance application may execute (e.g., via control circuitry 404 (FIG. 4)) a program script which iterates through each viewing history database corresponding to a particular user equipment based on an index viewing history data structure. The index viewing history data structure may be organized as an array where each index of the array contains a pointer to a viewing history database (e.g., stored locally in storage 408 or remotely at media guidance data source 518 accessible via communications network 514) for a user equipment. The media guidance application may iterate (e.g., via control circuitry 404 (FIG. 4)) through each row of the array and determine whether each user equipment generated the first media asset for display. For each user equipment the media guidance application determines generated the first media asset for display, the media guidance application may retrieve (e.g., via control circuitry 404 (FIG. 4)) a value from a field in the index viewing history data structure for the progress point, as discussed above. The media guidance application then determines (e.g., via control circuitry 404 (FIG. 4)) whether the user equipment generated the first media asset for display the threshold portion of the total duration. For example, the media guidance application may determine (e.g., via control circuitry 404 (FIG. 4)) that a progress point (e.g., 30 minutes) exceeds a threshold portion of the total duration (e.g., 10 minutes). The media guidance application may store (e.g., via control circuitry 404 (FIG. 4)) a list of the specific identifiers of user equipment that the media guidance application determined generated the first media asset for display the first threshold portion (i.e., the first subset).

Process 100 continues to 108, where the media guidance application identifies (e.g., via control circuitry 404 (FIG. 4)) a second subset of the first subset, the second subset comprising each user equipment (e.g., user equipment 502, 504, and 506) from which a second media asset, that is part of a group of media assets including the first media asset, was generated for display (e.g., on display 412) for a second threshold portion of a total duration of the second media asset. For example, the media guidance application may retrieve (e.g., via control circuitry 404 (FIG. 4)) the stored list containing the user equipment of the first subset and further filter the list based on whether each user equipment on the list generated for display a second media asset that is part of the group of media assets including the first media asset. As referred to herein, a group of media assets should be understood to be any two or more media assets related by at least one common characteristic. In some embodiments, the common characteristic may be any metadata stored at a media guidance database describing the media assets. For example, media assets may be part of a series (e.g., "Friends"), have a common time slot (e.g., 7-8 pm), and/or channel (e.g., FOX). The media guidance application may add a particular user equipment to the second subset regardless of whether the second media asset is sequential to the first media asset in a series (e.g., if the first media asset is episode one, the second media asset may be episode two or five and in both cases will result in the media guidance application adding the user equipment to the second subset).

Process 100 continues to 110, where the media guidance application calculates (e.g., via control circuitry 404 (FIG. 4)) a score for audience consistency for the group of media assets based on determining an amount of user equipment in the second subset relative to the amount of user equipment in the first subset. For example, the media guidance application may determine (e.g., via control circuitry 404 (FIG. 4)) how many user equipment identifiers are present on the list defining the second subset. As a specific example, the media guidance application may determine (e.g., via control circuitry 404 (FIG. 4)) that 100,000 user equipment are part of the second subset (e.g., the user equipment which generated multiple episodes of a series for display). The media guidance application may also determine (e.g., via control circuitry 404 (FIG. 4)) the total number of user equipment that generated the first media asset for display the threshold portion (e.g., any user equipment that generated the episode for display for which a score is being calculated). As a specific example, the media guidance application may determine (e.g., via control circuitry 404 (FIG. 4)) 300,000 user equipment are part of the first subset.

As referred to herein, the term "audience consistency" should be understood to mean a measure of the amount of user equipment that consume multiple media assets that are part of a group of related media assets. In some embodiments, a particular user equipment may contribute to the measure of audience consistency for a group of media assets if the user equipment has generated at least one other related media asset for display. In other embodiments, user equipment may need to generate a threshold number of related media assets for display in order to be considered "consistent." For example, the threshold number may be a minimum number of episodes of a series that have been generated for display by a particular user equipment (e.g., the user equipment is not part of the consistent audience for the series unless five episodes or more have been generated for display). In some embodiments, the measure may be a numerical score that allows for comparison of the audience consistency between different groups of media assets. In other embodiments, the measure may be any value that can be assigned to groups of media assets and then used to compare the groups of media assets. For example, the media guidance application may assign one group of media assets having "high" audience consistency and another group of media assets as "low" audience consistency (e.g., if most of the user equipment have not generated for display any other media assets that are part of the group of media assets).

The media guidance application may use these values to model (e.g., via control circuitry 404 (FIG. 4)) the audience consistency for the group of media assets. For example, the media guidance application may calculate (e.g., via control circuitry 404 (FIG. 4)) that 33% (e.g., 100,000/300,000) of the user equipment generated another media asset in addition to the first media asset for display. As a specific example, the media guidance application (e.g., via control circuitry 404 (FIG. 4)) may use a linear mapping of the percentage of user equipment that are repeat viewers (e.g., 33%) and generate a score of 33 out of 100. As another specific example, the media guidance application may (e.g., via control circuitry 404 (FIG. 4)) use a non-linear mapping of percentage to score to account for the fact that a percentage over 20% may be an excellent score for a group of media assets and, using this mapping, may calculate a score of 80 out of 100 for the same set of data. In some embodiments, the media guidance application may input (e.g., via control circuitry 404 (FIG. 4)) multiple values into a mathematical function to calculate the score for the group of media assets (e.g., a multivariate function), such as the absolute number of user equipment that generated another media asset for display in addition to the first media asset (e.g., 100,000), as well as the calculated percentage (e.g., 33%). Alternatively or additionally, the multiple values input to the mathematical function to calculate the score may be when each user equipment accessed the media asset, the source (e.g., content source 516 (FIG. 5)) each user equipment accessed the media asset from, and/or the device type of each user equipment device (e.g., user equipment 502, 504, and 506 (FIG. 5)).

In some embodiments, the media guidance application may store (e.g., via control circuitry 404 (FIG. 4)) an indication of whether each particular user equipment determined to be part of the second subset generated the second media asset for display within a threshold time from the original airdate of the media asset. For example, the media guidance application may store (e.g., via control circuitry 404 (FIG. 4)) a boolean set to "True" if the user watched the second media asset within 1 hour of the original airdate of the second media asset. The threshold time from the airdate of the original media asset may be zero minutes, in which case the boolean is set to "True" only if the media asset is generated for display live (e.g., as it airs at the first airdate). The media guidance application may determine (e.g., via control circuitry 404 (FIG. 4)) the airdate based on accessing data associated with the media asset at a media guidance data source (e.g., media guidance data source 518), or from data embedded in a video packet received from a content source (e.g., content source 516). The media guidance application may similarly store (e.g., via control circuitry 404 (FIG. 4)) a boolean for the first media asset on the first list if it was generated for display within the threshold time from the original airdate of the first media asset. In this way, the media guidance application may use the value stored in the boolean as a factor when determining (e.g., via control circuitry 404 (FIG. 4)) the score for audience consistency for a group of media assets. For example, if a greater number of repeat users watch a particular media asset live as opposed to weeks later (e.g., by recording the media asset), a higher score may be generated. In some embodiments, the media guidance application may remove (e.g., via control circuitry 404 (FIG. 4)) a user equipment from the second subset if the threshold time boolean is determined to be "False."

In other embodiments, the media guidance application may store (e.g., via control circuitry 404 (FIG. 4)) an indication of a respective source (e.g., content source 516) from which each particular user equipment determined to be part of the second subset generated the second media asset for display. For example, the media guidance application may store (e.g., via control circuitry 404 (FIG. 4)) a string set to "VOD" if the user watched the second media asset from a video-on-demand source. The source may be a video-on-demand source, cable channel, OTT source, DVR recording, or any other device or provider of media content. The media guidance application may similarly store (e.g., via control circuitry 404 (FIG. 4)) a string for the source of the first media asset on the first list. In this way, the media guidance application may use the value stored in the string as a factor when determining (e.g., via control circuitry 404 (FIG. 4)) the score for audience consistency for a group of media assets. For example, if a greater number of repeat users watch a particular media asset live (e.g., the source is a channel) as opposed to weeks later (e.g., the source is a DVR recording), a higher score may be generated. In some embodiments, the media guidance application may remove (e.g., via control circuitry 404 (FIG. 4)) a user equipment from the second subset based on the characters of the string identifying the source.

In another embodiment, the media guidance application may store (e.g., via control circuitry 404 (FIG. 4)) an indication of a respective device type (e.g., one of user equipment 502, 504, and 506) of each particular user equipment determined to be part of the second subset. For example, the media guidance application may store (e.g., via control circuitry 404 (FIG. 4)) a string set to "Mobile Phone" if the user watched the second media asset from a mobile phone. The source may be a set-top box, DVR, mobile phone, tablet, or any other user equipment capable of generating media assets for display. The media guidance application may similarly store (e.g., via control circuitry 404 (FIG. 4)) a string for the device type that generated for display the first media asset on the first list. In this way, the media guidance application may use the value stored in the string as a factor when determining (e.g., via control circuitry 404 (FIG. 4)) the score for audience consistency for a group of media assets. For example, if a greater number of repeat users watch a particular media asset on a set-top box as opposed to on a mobile phone, a higher score may be generated. In some embodiments, the media guidance application may remove (e.g., via control circuitry 404 (FIG. 4)) a user equipment from the second subset based on the characters of the string identifying the device type.

Process 100 continues to process 112, where the media guidance application ranks (e.g., via control circuitry 404 (FIG. 4)) the group of media assets among a plurality of groups of media assets based on the calculated score for audience consistency for the group of media assets. For example, the media guidance application may execute (e.g., via control circuitry 404 (FIG. 4)) a program script implementing a sorting algorithm commonly known in the art (e.g., merge sort or bubble sort) to rank the group of media assets among a plurality of other groups of media assets. For example, the calculated score for the series, "Game of Thrones" may be 80 out of a possible 100, which the media guidance application may determine (e.g., via control circuitry 404 (FIG. 4)) results in "Game of Thrones" having the 4$^{th}$ highest position on a ranked list for audience consistency if the scores of other groups of media assets on the ranked list are 10, 30, 90, 95, and 97.

Figure 6:
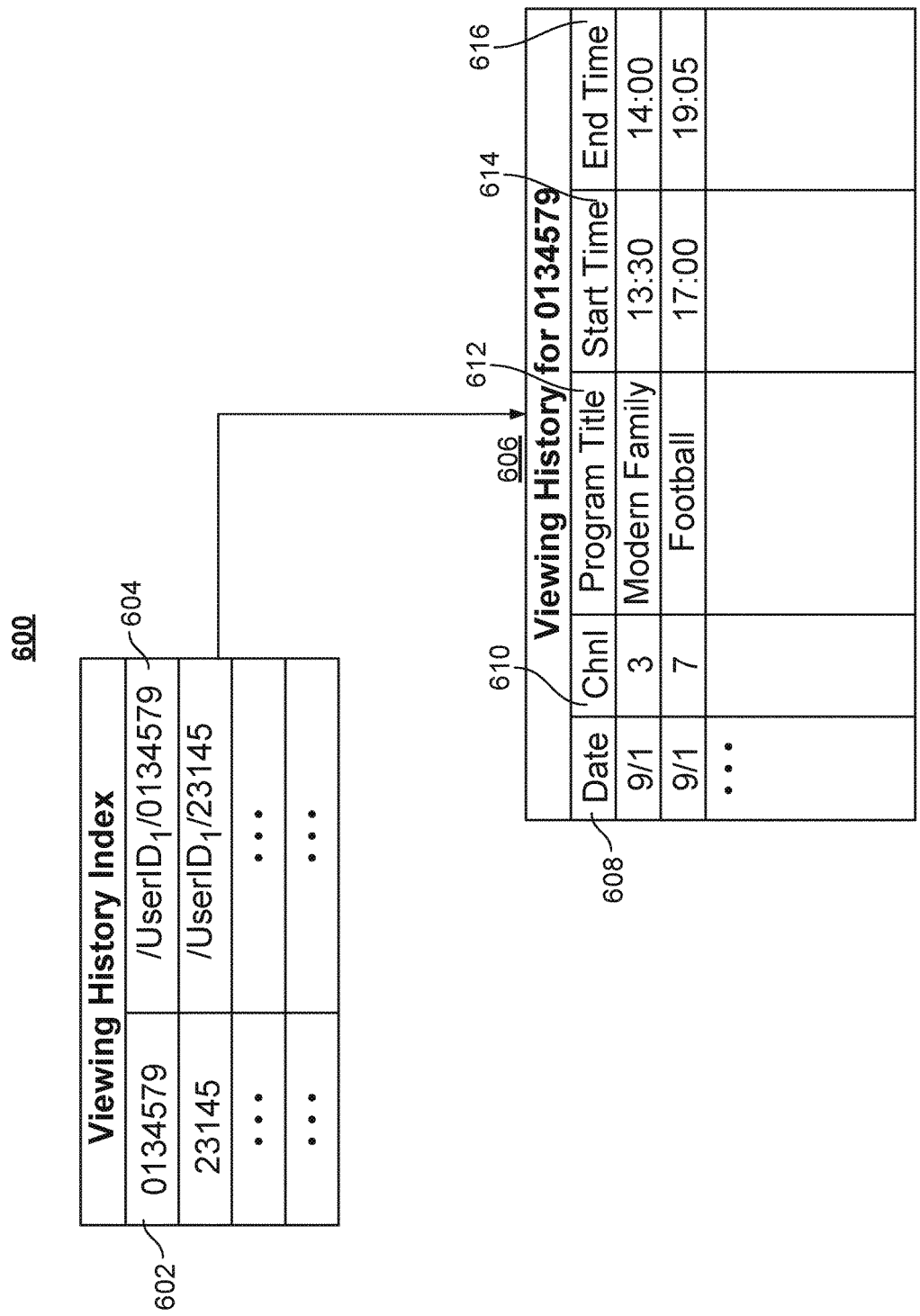
FIG. 6 shows an illustrative example of a database structure for storing the viewing history of user equipment, in accordance with some embodiments of the disclosure.

FIG. 6 shows an illustrative example of a database structure for storing the viewing history of user equipment, in accordance with some embodiments of the disclosure. For example, viewing history index 600 may be organized as a table containing specific identifiers for user equipment (e.g., identifier 602) and pointers to locations in memory where the viewing history for each user equipment is stored (e.g., pointer 604). Pointer 604 may point to a location in memory storing viewing history data structure 606, where media assets generated for display by user equipment with identifier 602 are stored. Viewing history data structure 606 and viewing history index 600 may be stored in storage (e.g., storage 408) of one or more user equipment (e.g., any of the user equipment listed in FIGS. 4-5), or remotely at a media guidance data source (e.g., media guidance data source 518) accessible via a communications network (e.g., communications network 514). A media guidance application may be executed by one or more user equipment (e.g., any of the user equipment listed in FIGS. 4-5) to store and fetch data from viewing history data structure 606 and viewing history index 600.

Viewing history data structure 606 may be organized as a table, where media assets generated for display by user equipment with identifier 602 are stored. Viewing history data structure 606 may contain information about a particular time period user equipment identified by identifier 602 was generating a media asset for display. The particular time period may be defined by the date (e.g., date 608), start and end times (e.g., start time 614 and end time 616). The media guidance application may subtract start time from end time to determine a progress point viewing a particular media asset, or may store in a separate field of viewing history data structure 606. Media assets may be defined by any associated metadata, such as a unique program identifier assigned by the content provider, or a title (e.g., program title 612), keyword, or channel (e.g., channel 610).

In some embodiments, the media guidance application may extract, from the data packet from the user equipment, a progress point and a specific identifier for the user equipment. For example, the media guidance application may extract, by executing an SQL script utilizing the declarative "Select" command, the specific identifier and the progress point from fields in a table transmitted in the data packet, which may be organized in a similar fashion to viewing history data structure 606. The specific identifier may be any combination of alphanumeric characters that are specific to each user equipment. As a specific example, the media guidance application may extract identifier 602. The media guidance application may store the data from the data packet in viewing history data structure 606 as a new entry. For example, the media guidance application may determine that a media asset with title, "Modern Family" on channel 3 was generated for display from times 13:30 to 14:00 based on data in the data packet and store the data in the appropriate field of the new entry. If the entry for the media asset is already created in viewing history data structure 606, the media guidance application may update the progress based on comparing the stored value for the progress point with a value extracted from the data packet.

In other embodiments, the media guidance application may receive multiple data packets indicating the user equipment has generated for display discrete segments of the media asset. For example, the media guidance application may receive two data packets, one that indicates the user equipment generated "Modern Family" for display from 13:30 to 13:35 and one that indicates the user equipment has generated for display the media asset from 13:50 to 14:00. The media guidance application may sum the total minutes viewed and store the value (e.g., 15 minutes) as the progress point in a field of viewing history data structure 606 for an entry in the data structure for the specific episode of "Modern Family." In this way, the media guidance application can designate user equipment as generating for display a threshold portion of the media asset even though the user equipment may do so non-contiguously (e.g., due to a user changing back and forth between channels on a television).

The media guidance application may determine the progress point by extracting and comparing fields in the entry for start time and end time that a program was generated for display. As a specific example, the media guidance application may extract that the episode of "Modern Family" was generated for display from 13:30 to 14:00. The media guidance application may subtract the start value from the end value and determine the progress point as 30 minutes of the episode, because that is the length that was generated for display.

In some embodiments, the media guidance application may use the progress point to calculate the percentage of the total program viewed. The media guidance application may determine the total duration of the episode by accessing a media guidance database and retrieving the total duration of the media asset from a field in the database. For example, the media guidance application may retrieve from a field in an entry for the media asset that the total duration of the episode is one hour. The media guidance application may then calculate the percentage of the media asset generated for display by the user equipment by dividing the progress point by the retrieved total duration. For example, the media guidance application may determine the percentage as 100% of the episode that has been generated for display by the user equipment. In some embodiments, the media guidance application may store, in a field of viewing history data structure 606 for the user equipment identified by identifier 602, the percentage of the first media asset generated for display. The media guidance application may maintain viewing history data structures (e.g., viewing history data structure 606) for each of a plurality of user equipment and use the data contained in each when generating a model for audience consistency.

Figure 7:
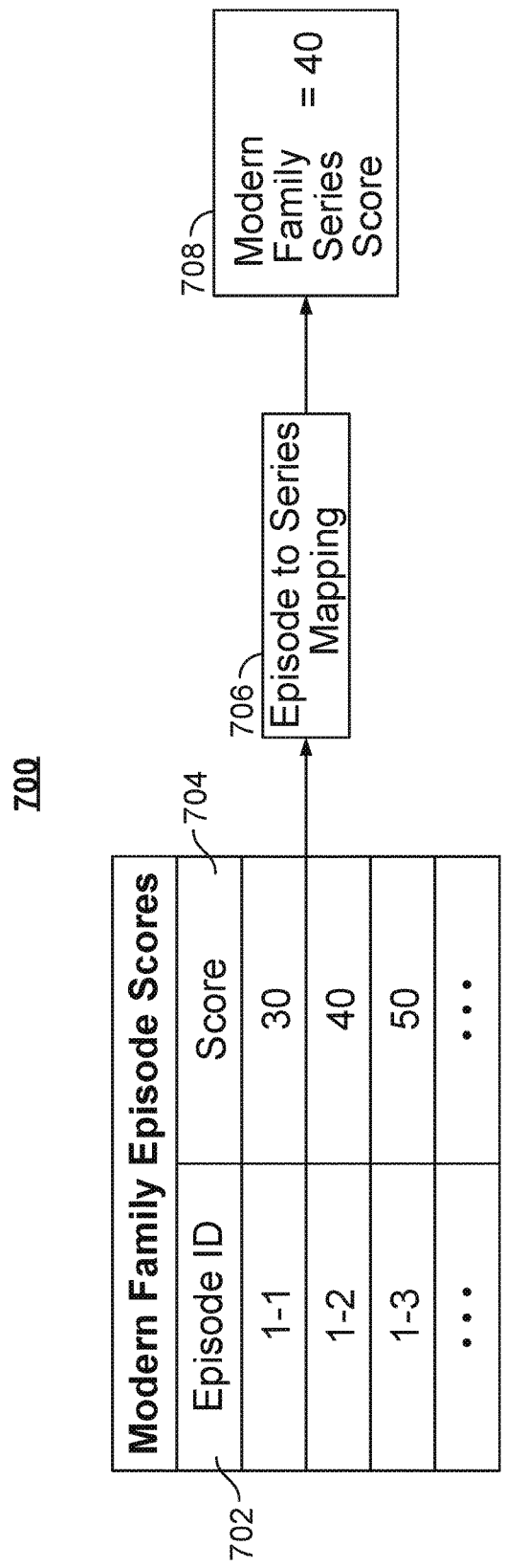
FIG. 7 shows an illustrative example of mapping audience consistency scores for individual media assets to an audience consistency score for a group of media assets, in accordance with some embodiments of the disclosure.

FIG. 7 shows an illustrative example of mapping audience consistency scores for individual media assets to an audience consistency score for a group of media assets, in accordance with some embodiments of the disclosure. For example, scores for individual media assets (e.g., episodes of a series) may be stored in media asset score data structure 700, which may be organized as a table with media asset identifiers (e.g., identifiers 702) and corresponding audience consistency scores (e.g., scores 704). The set of scores (e.g., scores 704) may be mapped using episode to series mapping 706 to an audience consistency score for a group of media assets (e.g., group of media assets score 708). Media asset score data structure 700 may be stored in memory (e.g., in storage 408) of one or more user equipment (e.g., any of the user equipment listed in FIGS. 4-5) or remotely (e.g., at media guidance data source 518 accessible via communications network 514). Additionally, a media guidance application performing episode to series mapping 706 may be executed by control circuitry (e.g., control circuitry 404) of one or more user equipment (e.g., any of the user equipment listed in FIGS. 4-5).

In some embodiments, when calculating a score for audience consistency for the group of media assets, the media guidance application may determine a score for each media asset in the group of media assets. For example, for each media asset (e.g., as identified by identifiers 702) of the group of media assets, the media guidance application may determine whether each user equipment previously generated another media asset for display based on accessing the viewing history database for each user equipment, as described above. As a specific example, the media guidance application may determine that for one episode of a series (e.g., "Modern Family") there were a greater number of user equipment that hadn't generated for display another media asset in the series (e.g., "Modern Family") than in a second episode and accordingly assigns different scores (e.g., scores 704) to the two episodes.

The media guidance application may then calculate an average score by averaging the score for each media asset in the group of media assets. For example, the media guidance application may determine that the average score for an episode of a series (e.g., "Modern Family") is 40 out of a possible 100. The media guidance application may then map (e.g., using episode to series mapping 706) the average score to the score for audience consistency for the group of media assets (e.g., group of media assets score 708) by processing the average score with a first mathematical function. For example, the media guidance application may execute a more complex episode to series mapping 706 by weighing additional factors, such as the number of episodes in the series for which a score was calculated and the distribution of user equipment at different time points in the media asset (e.g., whether after 10 minutes most user equipment stopped generating the media asset for display).

In some embodiments, the media guidance application alternatively or additionally considers the variance (the sum of the difference squared between each media asset score and the average score) when determining the score for audience consistency for the group of media assets. For example, if episode one of a series (e.g., "Modern Family") is substantially above the average and episode two is substantially below, there will be a higher variance than if the two episodes were both close to the average (e.g., scores 704 will vary over a greater range). The media guidance application may map (e.g., episode to series mapping 706) the variance to the score for audience consistency for the group of media assets (e.g., group of media assets score 708) by processing the variance with a second mathematical function. For example, the media guidance application may assign a lower score based on a calculated higher variance between two series because, while the average audience consistency may be the same in both cases, the higher variance signals a wide variety in the consistency of individual episode audiences.

In some embodiments, the group of media assets is a series and the first and second media assets are episodes of the series, where the episodes are transmitted by a content provider at different times. In this situation, the media guidance application may retrieve a first score for the first episode of the series and a second score for the second episode of the series (e.g., scores 704 associated with identifiers 702). For example, the media guidance application may retrieve a score of 40/100 for episode 2 of season 1 of a series (e.g., "Modern Family") and a score of 50/100 for episode 3 of season 1 of the series (e.g., "Modern Family"). The media guidance application may then determine whether the first score is greater than the second score. For example, the media guidance application may determine whether the score (e.g., scores 704) is trending up or down with each subsequent episode in time. As a specific example, because episode 3 of season 1 has a higher score than episode 2 of season 1, the media guidance application may determine that the score is trending up (e.g., the second score is greater than the first score).

The media guidance application, in response to determining the first score is greater than the second score, may increase the score for audience consistency for the series (e.g., group of media assets score 708). For example, the media guidance application may weight a trend in the consistency of viewers between episodes when calculating the score for audience consistency for the series, as described above. As a specific example, if there was no trend between episodes, the media guidance application may calculate the score for audience consistency (e.g., group of media assets score 708) as the average of the scores for the episodes. If there is an upward trend as discussed, the media guidance application may increase the score for audience consistency (e.g., group of media assets score 708) by a factor. A factor may be any value multiplied or added to the score to adjust the score based on the determined trend. For example, the factor may be the value 2 which is added to the score if an upward trend is determined and subtracted if a downward trend is determined. As a specific example, if the number or percentage of consistent viewers decreases from episode 3 of a series to episode 4 of a series, the media guidance application may subtract 2 from the calculated score for the episode and/or the series. In some embodiments, the media guidance application may determine (e.g., via control circuitry 404 (FIG. 4)) the factor based on the magnitude of the determined trend. For example, the media guidance application may retrieve (e.g., via control circuitry 404 (FIG. 4)) from a data structure storing values for factors correlated with magnitudes of trends, a value in a field corresponding to the magnitude of the determined trend (e.g., the score has gone down 50% between two consecutive episodes).

Figure 8:
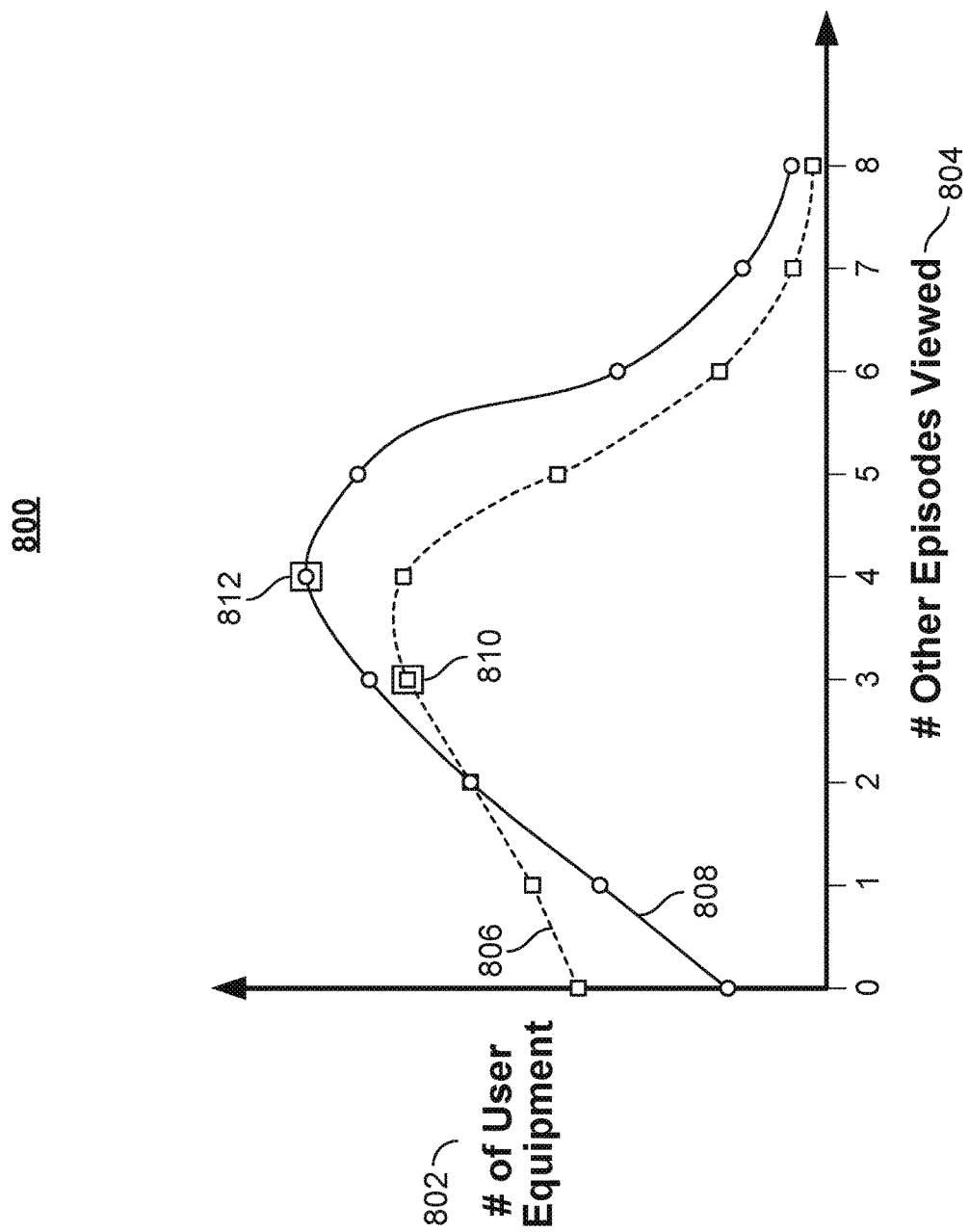
FIG. 8 shows an illustrative example of a distribution of other media assets in a group of media assets generated for display by user equipment for two different media assets, in accordance with some embodiments of the disclosure.

FIG. 8 shows an illustrative example of a distribution of other media assets in a group of media assets generated for display by user equipment for two different media assets, in accordance with some embodiments of the disclosure. For example, graph 800 plots number of user equipment 802 against number of other episodes viewed 804. Curves 806 and 808 represent mathematical approximations to a data set of number of episodes viewed per user equipment for two different episodes of a series. The data sets may be stored in memory (e.g., storage 408) of one or more user equipment (e.g., any of the user equipment listed in FIGS. 4-5), and/or generated from data in the viewing history databases for each user equipment, as described above in FIG. 6. In some embodiments, the data sets may be stored remotely (e.g., at media guidance data source 518) accessible via a communications network (e.g., communications network 514).

In some embodiments, the media guidance application may iterate through each viewing history data structure (corresponding to each user equipment of a plurality of user equipment) and determine the number of episodes of a particular series that the user equipment has generated for display. For example, a particular user equipment may have generated for display 2 episodes of a series when episode 4 aired, but may have generated for display 3 when episode 5 aired. As another example, the media guidance application may determine that the user equipment did not generate episode 5 at all, which may result in no score being added to a particular episode distribution and reflected in the episode score for audience consistency.

In other embodiments, the media guidance application may determine, for an ordered series of media assets, whether user equipment generated later available episodes for display and re-calculate the score for episodes available earlier. In these situations, the media guidance application may automatically re-calculate the score for any media assets that was available previously when a new media asset of the group of media assets becomes available. For example, a particular user equipment may generate episode two for display, but not episode one, of a given series. At the time of episode two becoming available, the media guidance application would determine that the particular user equipment should not be part of the second subset, and hence is not calculated as part of a consistent audience, as the user equipment has only generated one media asset of the series for display. However, in some cases the user equipment may generate for display another media asset that is part of the series in the future (e.g., episode four of the series). In order to capture that the user equipment has become part of the consistent audience, based on generating for display two episodes of the series (e.g., both episodes two and four), the media guidance application re-calculates the score for episode two (and any other previous episodes) any time a new media asset becomes available. In this way, the media guidance application will consider user equipment part of the consistent audience if they generate for display any two media assets, regardless of sequence or whether the episodes are contiguous, when calculating scores for each individual episode.

In some embodiments, the media guidance application may re-calculate the score for each available media asset of a group of media assets at a regular interval. For example, OTT content providers (as discussed in relation to FIG. 5) may provide all media assets of a group of media assets at a single time or in a non-linear fashion. However, it still users time to consume the media assets and thus over time a user equipment may generate more media assets of the group of media assets for display, thus becoming part of the consistent audience. By periodically re-calculating the scores for each media asset in a group of media assets, the media guidance application may calculate a more accurate score for audience consistency for the group of media assets.

The media guidance application may bin the data (e.g., based on whether the user equipment generated the media asset for a threshold portion as described above) into discrete numbers of episodes viewed (e.g., 1, 2, 3 . . . ). In some embodiments, the media guidance application may use all the progress points regardless of whether the progress points exceed the threshold portion when generating a distribution for an episode (e.g., curves 806 and 808). The media guidance application may use a mathematical model to approximate curves 806 and 808, e.g., using a least-squares fitting algorithm. Once the media guidance application approximates the data to curves 806 and 808 for two episodes, the media guidance application may perform a variety of mathematical operations to better model the audience consistency. For example, the media guidance application may determine trends in the number of episodes generated for display by user equipment, such as by determining the maximum of curves 806 and 808 (e.g., max 810 and 812, respectively). If the episode being approximated by curve 808 aired at a later date than 806, the media guidance application may determine that because users are continuing to watch episodes of the series, the users are committed to the series and are likely to continue watching. In contrast, if the number of other episodes generated for display decreases (e.g., the max decreases), then the media guidance application may determine that more and more users are dropping out and not watching the media asset.

The media guidance application may normalize curves 806 and 808 such that trends are not obscured by large numbers of unique (e.g., 1 episode) viewers. Alternatively or additionally, the media guidance application may also look at the un-normalized curves to see the absolute value of user equipment that have generated for display each number of episodes. Alternatively or additionally, the media guidance application may analyze the width (e.g., via a full-width at half maximum calculation when fitting the curves to a Gaussian distribution) of the curves to determine the variability in the types of users viewing episodes of the series and how that is changing with subsequent episodes.

In some embodiments, the media guidance application may identify a third subset of the second subset, the third subset comprising each user equipment from which a third media asset, that is part of the group of media assets including the first media asset and the second media asset, was generated for display for a third threshold portion of a total duration of the third media asset. For example, the media guidance application may determine user equipment that generated for display more than the first and second media asset that are part of the group of media assets (e.g., number of other episodes viewed 804 is greater than 1). As a specific example, the media guidance application may determine that a particular user equipment viewed 17 episodes of "Game of Thrones."

The media guidance application may then determine an amount of user equipment in the third subset. For example, as discussed for determining the number of user equipment in the second subset, the media guidance application may sum the number of user equipment identifiers stored in the list to determine the number (e.g., the value of curve 410 or 412 for a certain number of other episodes viewed). The media guidance application may then adjust the score for the group of media assets based on a weight for each of the amount of user equipment in the third subset. For example, the media guidance application may determine that because most of the user equipment in the second subset also generated multiple other media assets for display to increase the score for audience consistency for the group of media assets. As a specific example, the score for a media asset represented by curve 408 may be higher than for a media asset represented by curve 406, even if the total number of viewers of multiple media assets in the group is the same (e.g., the area under the curve is the same), because the maximum (e.g., max 412) corresponds to a greater number of episodes generated for display for curve 408. In some embodiments, the distribution of number of episodes viewed by each user equipment may also be used by the media guidance application when calculating the audience consistency score (e.g., if a large number of user equipment have generated all of the media assets that are part of a group of media assets, the value to an promotional content provider may be greater and the score may be increased as such).

Figure 9:
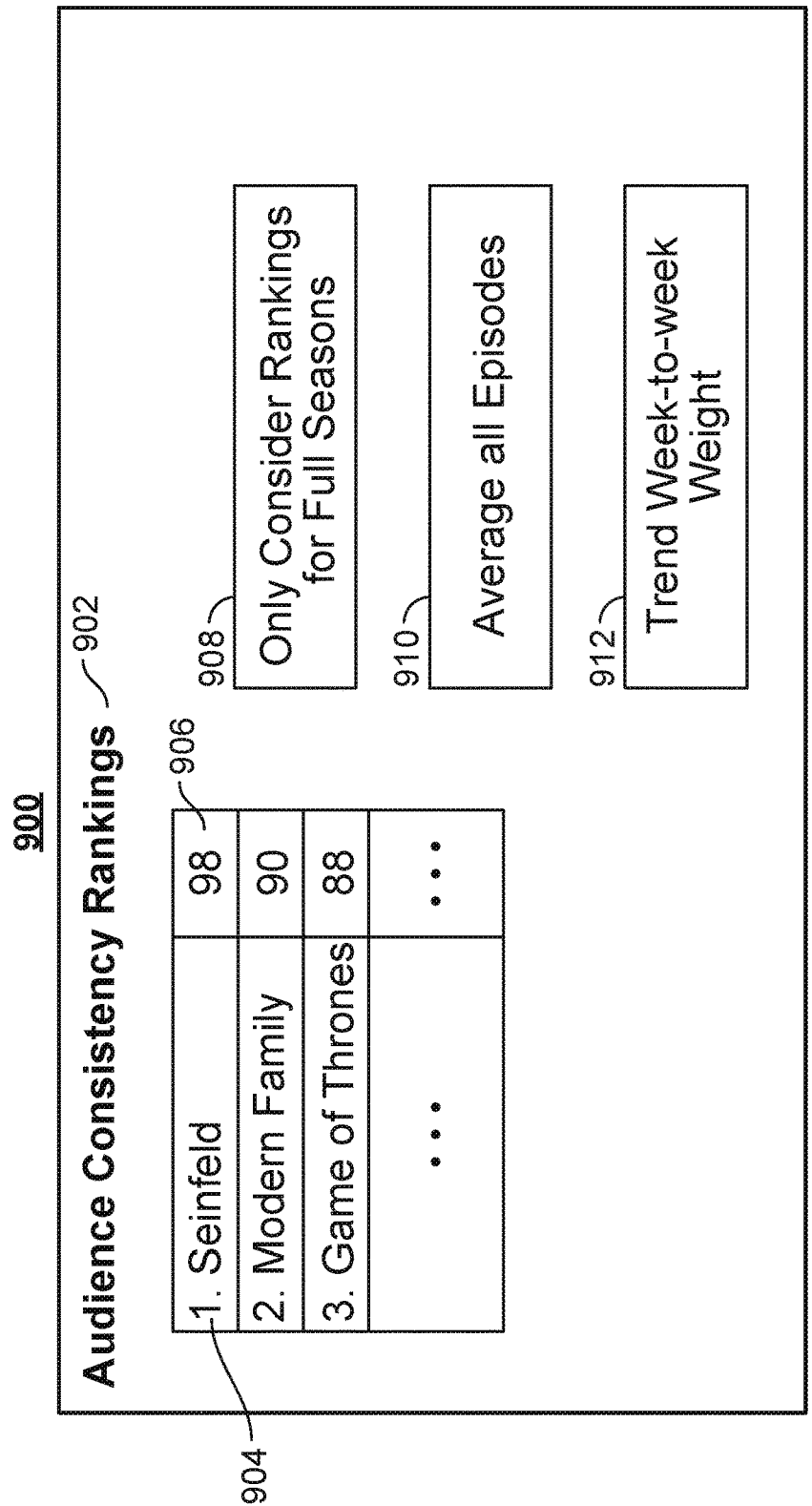
FIG. 9 shows an illustrative example of a display for adjusting the audience consistency model, in accordance with some embodiments of the disclosure.

FIG. 9 shows an illustrative example of a display for adjusting the audience consistency model, in accordance with some embodiments of the disclosure. For example, FIG. 9 shows display 900 with audience consistency ranking 902, which contain scores (e.g., score 906) for groups of media asset (e.g., group 904). Display 900 includes a plurality of options (e.g., options 908, 910, and 912) to adjust the model for calculating the audience consistency score (e.g., score 906) for groups of media assets. Display 900 may appear on one or more user equipment (e.g., any of the user equipment listed in FIGS. 4-5). Moreover, the media guidance application may use one or more of the processes described in FIGS. 10-14 below to generate display 900 or any of the features described therein.

In some embodiments, the media guidance application generates for display (e.g., via control circuitry 404) a user interface (e.g., on display 900) with the ranking of the plurality of groups of media assets (e.g., audience consistency ranking 902) with a plurality of selectable options to adjust the score for audience consistency. For example, the media guidance application may generate for display (e.g., on display 900) a selectable option (e.g., option 908) to only rank full seasons of groups of media assets (e.g., because a trend mid-season may be too variable to extract statistically significant information relating to audience consistency). The media guidance application may also generate options to average all episodes (e.g., option 910), weight specific trends higher or lower (e.g., option 912), and/or to filter the rankings by genre or other category of a group of media assets. The media guidance application may then receive a user selection of an option of the plurality of selectable options. For example, the media guidance application may receive, via a user input interface (e.g., user input interface 410), a user selection of an option.

The media guidance application may then modify the score for audience consistency for each group of media assets of the plurality of groups of media assets based on the user selection. For example, upon receiving a selection of the option (e.g., option 908) to only rank full seasons, the media guidance application may filter out groups of media assets from the ranking for which a score is not available for each episode of a season. As another example, upon receiving a selection of the option (e.g., option 910) to average all episodes, the media guidance application may average the scores for each episode of a series when generating the audience consistency score for each series. As yet another example, upon receiving a selection of the option (e.g., option 912) to adjust trend weight, the media guidance application may present an additional menu allowing the user to fine tune trends between episodes (e.g., weight the average number of other episodes viewed higher than the width of the distribution as described in FIG. 8 above). By allowing for fine-tuning of the model, factors that certain promotional content providers are especially interested in when purchasing advertising slots can be weighted accordingly. The media guidance application may then rank the plurality of groups of media assets based on the modified score for audience consistency for each group of media assets. For example, the media guidance application may re-rank the groups of media assets based on the modified score and may regenerate audience consistency rankings 902.

Figure 10:
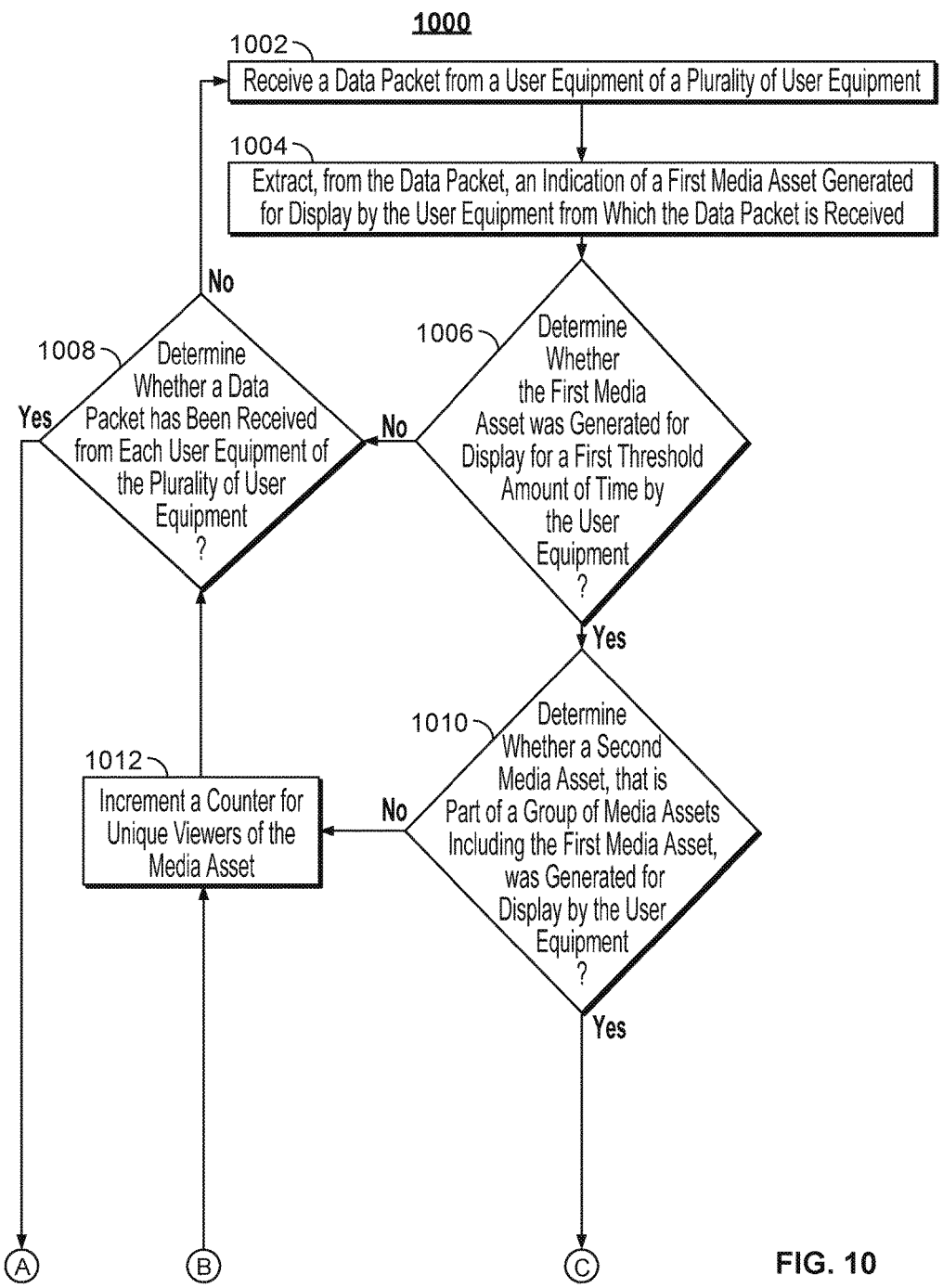
FIG. 10 is another flowchart of illustrative steps for modeling consistency of audiences viewing groups of media assets, in accordance with some embodiments of the disclosure.
Figure 10:
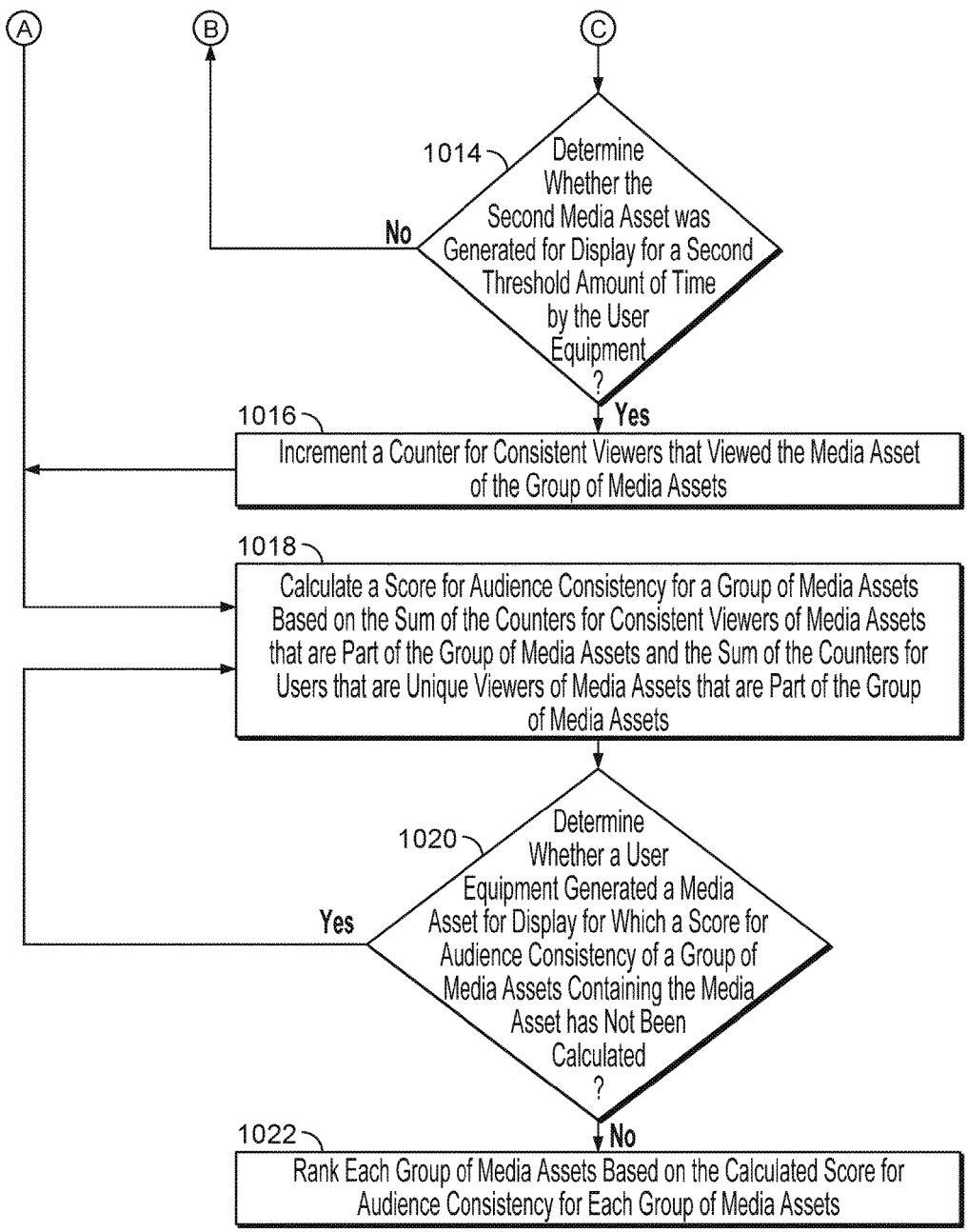

FIG. 10 is another flowchart of illustrative steps for modeling consistency of audiences viewing groups of media assets, in accordance with some embodiments of the disclosure. For example, a media guidance application implementing process 1000 may be executed by control circuitry 404 (FIG. 4). It should be noted that process 1000 or any step thereof could be performed on, or provided by, any of the devices or equipment shown in FIGS. 4-5.

Process 1000 begins at 1002, where the media guidance application receives (e.g., via control circuitry 404 (FIG. 4)) a data packet from a user equipment (e.g., any of user equipment 502, 504, and 506) of a plurality of user equipment. For example, the media guidance application may receive (e.g., via control circuitry 404 (FIG. 4) over communications network 514) a data packet containing a table including an identifier for a media asset that a specific user equipment is generating for display (e.g., on display 412). In some embodiments, the media guidance application may receive (e.g., via control circuitry 404 (FIG. 4)) data packets continuously (e.g., streamed) from user equipment to provide continual updates on the media asset being generated for display by the user equipment. In other embodiments, the media guidance application may receive (e.g., via control circuitry 404 (FIG. 4)) data packets periodically from user equipment to provide updates on any media assets that were generated for display by the user equipment after the previous transmission.

Process 1000 continues to 1004, where the media guidance application extracts (e.g., via control circuitry 404 (FIG. 4)), from the data packet, an indication of a first media asset generated for display by the user equipment from which the data packet is received. For example, the media guidance application may extract (e.g., via control circuitry 404 (FIG. 4)), by executing an SQL script utilizing the declarative "Select" command, the indication of the first media asset generated for display from a field of the transmitted data packet. The indication of the first media asset may be any identifying metadata related to the media asset, such as the title of the media asset or a unique program identifier assigned by a content provider. For example, the media guidance application may extract (e.g., via control circuitry 404 (FIG. 4)) the string, "And Now His Watch Is Ended" as the identifier, which identifies a particular episode of the series "Game of Thrones," that was generated for display by the user equipment.

Process 1000 continues to 1006, where the media guidance application determines (e.g., via control circuitry 404 (FIG. 4)) whether the media asset was generated for display for a first threshold amount of time by the user equipment. For example, the media guidance application may determine (e.g., via control circuitry 404 (FIG. 4)) that a progress point (e.g., 30 minutes) exceeds a threshold portion of the total duration (e.g., 10 minutes). The media guidance application may determine a value for the first threshold portion based on the content of the media asset (e.g., metadata associated with the media asset), as described further in FIG. 14 below. The media guidance application may retrieve (e.g., via control circuitry 404 (FIG. 4)) the progress point from a field in a viewing history data structure for the user equipment (e.g., as described in FIG. 2). In some embodiments, the media guidance application may extract (e.g., via control circuitry 404 (FIG. 4)) the progress point from the data packet received from the user equipment, as described below in FIG. 11.

If, at 1006, the media guidance application determines that the media asset was not generated for display for the first threshold amount of time, process 1000 continues to 1008, where the media guidance application determines (e.g., via control circuitry 404 (FIG. 4)) whether a data packet has been received from each user equipment of the plurality of user equipment. For example, the media guidance application may execute (e.g., via control circuitry 404 (FIG. 4)) a program script utilizing a for-loop to iterate through each user equipment and media assets the user equipment have and/or are currently generating for display. As discussed relation to in FIG. 2, the media guidance application may maintain (e.g., via control circuitry 404 (FIG. 4)) an index data structure (e.g., a table) containing specific identifiers for all user equipment monitored by the media guidance application and pointers to viewing history data structures for each user equipment. In this example, the media guidance application may iterate (e.g., via control circuitry 404 (FIG. 4)) through each user equipment in the index data structure.

If, at 1008, the media guidance application determines that a data packet has not been received from each user equipment of the plurality of user equipment, process 1000 returns to 1002, where the media guidance application receives (e.g., via control circuitry 404 (FIG. 4)) a data packet from a user equipment of a plurality of user equipment. For example, if the media guidance application executes (e.g., via control circuitry 404 (FIG. 4)) a program script implementing a for-loop to examine data packets received from each user equipment of plurality of user equipment, until the loop terminates the media guidance application continues to determine whether user equipment generated for display multiple media assets of a group of media assets.

If, at 1006, the media guidance application determines that the media asset was generated for display for the first threshold amount of time, process 1000 continues to 1010, where the media guidance application determines (e.g., via control circuitry 404 (FIG. 4)) whether a second media asset, that is part of a group of media assets including the first media asset, was received by the user equipment. For example, the media guidance application may retrieve (e.g., via control circuitry 404 (FIG. 4)) the stored list containing the user equipment of the first subset and further filter the list based on whether each user equipment on the list generated for display a second media asset that is part of the group of media assets including the first media asset. For example, media assets may be part of a series (e.g., "Friends"), have a common time slot (e.g., 7-8 pm), and/or channel (e.g., FOX). The media guidance application may determine (e.g., via control circuitry 404 (FIG. 4)) whether a user equipment has generated for display a second media asset that is part of a group of media assets including the first media asset by retrieving and comparing metadata in entries of a media guidance database (e.g., stored either locally in storage 408, or remotely at media guidance data source 518) as described further below in FIG. 12. The media guidance application may maintain (e.g., via control circuitry 404 (FIG. 4)) a list or other data structure storing specific identifiers of user equipment that have generated for display the first media asset the first threshold amount of time (e.g., the first subset as described in FIG. 1).

If, at 1010, the media guidance application determines (e.g., via control circuitry 404 (FIG. 4)) that there is not a second media asset, that is part of a group of media assets including the first media asset, that was generated for display by the user equipment, process 1000 continues to 1012, where the media guidance application increments (e.g., via control circuitry 404 (FIG. 4)) a counter for unique viewers of the media asset. For example, the media guidance application may initialize (e.g., via control circuitry 404 (FIG. 4)) a counter for unique viewers when executing process 1000. The media guidance application may increment (e.g., via control circuitry 404 (FIG. 4)) the counter (e.g., by one) for each user equipment that is determined to have generated for display the first media asset but no other media assets that are part of a group of media assets including the first media asset. For example, the media guidance application may determine (e.g., via control circuitry 404 (FIG. 4)) that a user equipment only generated for display one episode of a plurality of episodes of a series. The media guidance application then may increment (e.g., via control circuitry 404 (FIG. 4)) the counter for unique viewers for that particular episode by one. In some embodiments, the counter is scaled by a mapping from user equipment to number of viewers. For example, the data received by the media guidance application is for user equipment, not viewers. The media guidance application may utilize (e.g., via control circuitry 404 (FIG. 4)) a mapping function for user equipment to number of viewers based on, e.g., the average number of people in a household associated with the user equipment. After incrementing the counter for unique viewers of the media asset, process 1000 continues to process 1008, where the media guidance application determines (e.g., via control circuitry 404 (FIG. 4)) whether a data packet has been received from each user equipment of the plurality of user equipment, as described above.

If, at 1010, the media guidance application determines that a second media asset, that is part of a group of media assets including the first media asset, was generated for display by the user equipment, process 1000 continues to 1014, where the media guidance application determines (e.g., via control circuitry 404 (FIG. 4)) whether the second media asset was generated for display for a second threshold amount of time by the user equipment. For example, as described above for the first media asset, the media guidance application may determine (e.g., via control circuitry 404 (FIG. 4)) that a progress point (e.g., 30 minutes) exceeds a threshold portion of the total duration (e.g., 10 minutes). The media guidance application may determine a value for the second threshold portion based on the content of the media asset (e.g., metadata associated with the media asset), as described further in FIG. 14 below. The media guidance application may retrieve (e.g., via control circuitry 404 (FIG. 4)) the progress point from a field in a viewing history data structure for the user equipment (e.g., as described in FIG. 6). In some embodiments, the media guidance application may extract (e.g., via control circuitry 404 (FIG. 4)) the progress point from the data packet received from the user equipment, as described below in FIG. 11.

If, at 1014, the media guidance application determines that the second media asset was not generated for display for the second threshold amount of time, process 1000 continues to 1012, where the media guidance application increments (e.g., via control circuitry 404 (FIG. 4)) a counter for unique viewers of the media asset. For example, as described above, the media guidance application may initialize (e.g., via control circuitry 404 (FIG. 4)) a counter for unique viewers when executing process 1000. The media guidance application may increment (e.g., via control circuitry 404 (FIG. 4)) the counter (e.g., by one) for each user equipment that is determined to have generated for display the first media asset, but no other media assets that are part of a group of media assets including the first media asset, for a threshold amount of time. As a specific example, the media guidance application may determine (e.g., via control circuitry 404 (FIG. 4)) that a user watched one episode of "Game of Thrones" the threshold amount of time, but only watched a previous episode for less than the threshold amount of time. Accordingly, the media guidance application increments (e.g., via control circuitry 404 (FIG. 4)) the counter for unique viewers of the media asset. After incrementing the counter for unique viewers of the media asset, process 1000 continues to process 1008, where the media guidance application determines (e.g., via control circuitry 404 (FIG. 4)) whether a data packet has been received from each user equipment of the plurality of user equipment, as described above.

If, at 1014, the media guidance application determines that the second media asset was generated for display for the second threshold amount of time, process 1000 continues to 1016, where the media guidance application increments (e.g., via control circuitry 404 (FIG. 4)) a counter for consistent viewers that viewed the media asset of the group of media assets. For example, the media guidance application may initialize (e.g., via control circuitry 404 (FIG. 4)) a counter for consistent viewers (e.g., corresponding to user equipment that generated for display multiple episodes of the group of media assets) when executing process 1000. The media guidance application may increment (e.g., via control circuitry 404 (FIG. 4)) the counter (e.g., by one) for each user equipment that is determined to have generated for display the first media asset and another media asset for corresponding threshold amounts of time. In some embodiments, the counter is scaled by a mapping from user equipment to number of viewers. For example, the data received by the media guidance application is for user equipment, not viewers. The media guidance application may utilize (e.g., via control circuitry 404 (FIG. 4)) a mapping function for user equipment to number of viewers based on, e.g., the average number of people in a household associated with the user equipment. The media guidance application may maintain (e.g., via control circuitry 404 (FIG. 4)) a list or other data structure storing specific identifiers of user equipment that have generated for display the second media asset, that is part of the group including the first media asset, the second threshold amount of time (e.g., the second subset as described in FIG. 1). After incrementing the counter for consistent viewers of the group of media assets, process 1000 continues to process 1008, where the media guidance application determines (e.g., via control circuitry 404 (FIG. 4)) whether a data packet has been received from each user equipment of the plurality of user equipment, as described above.

If, at 1008, the media guidance application determines that a data packet has been received from each user equipment of the plurality of user equipment, process 1000 continues to 1018, where the media guidance application calculates (e.g., via control circuitry 404 (FIG. 4)) a score for audience consistency for a group of media assets based on the sum of the counters for consistent viewers of media assets that are part of the group of media assets and the sum of the counters for users that are unique viewers of media assets that are part of the group of media assets. For example, the media guidance application may perform (e.g., via control circuitry 404 (FIG. 4)) any mathematical operation to calculate the score for a media asset of a group of media assets as described above in FIGS. 1-5. As a specific example, the media guidance application may utilize (e.g., via control circuitry 404 (FIG. 4)) a mathematical function to process the values in the counter for unique viewers and counter for consistent viewers and generate a score, such as 80 out of a possible 100.

Process 1000 continues to 1020, where the media guidance application determines (e.g., via control circuitry 404 (FIG. 4)) whether a user equipment generated a media asset for display for which a score for audience consistency of a group of media assets containing the media asset has not been calculated. For example, in order to calculate the score for audience consistency for the group of media assets, the media guidance application may need to calculate scores for each media asset that is a member of the group of media assets (e.g., as described below in FIG. 13). The media guidance application may store (e.g., via control circuitry 404 (FIG. 4)) and update scores for media assets in a data structure.

The media guidance application may retrieve (e.g., via control circuitry 404 (FIG. 4)) scores for media assets determined to be part of the group of media assets (e.g., as described below in FIG. 12) and determine (e.g., via control circuitry 404 (FIG. 4)) whether scores have been calculated for each media asset that is part of the group of media assets. As a specific example, the media guidance application may determine (e.g., via control circuitry 404 (FIG. 4)) whether a score for all episodes of a series before a current episode have a score for audience consistency. If, at 1020, the media guidance application determines a user equipment generated for display a media asset of the group of media assets for which a score has not been calculated, process 1000 returns to 1018 and the media guidance application calculates (e.g., via control circuitry 404 (FIG. 4)) the score for the media asset. For example, the media guidance application may iterate through the viewing history databases for each user equipment (e.g., as described above in FIG. 6) and perform process 100 or 1000 for the specific episode for which a score was not calculated. After the score for each media asset of the group of media assets is calculated, the media guidance application may calculate (e.g., via control circuitry 404 (FIG. 4)) the score for the group of media assets, as described above in FIGS. 6-9.

If, at 1020, the media guidance application determines no user equipment has generated for display a media asset of the group of media assets for which a score has not been calculated, process 1000 continues to 1022, where the media guidance application ranks (e.g., via control circuitry 404 (FIG. 4)) the group of media assets among a plurality of groups of media assets based on the calculated score for audience consistency for the group of media assets. For example, the media guidance application may execute (e.g., via control circuitry 404 (FIG. 4)) a program script implementing any commonly known sorting algorithm (e.g., merge sort or bubble sort) to rank the group of media assets among a plurality of other groups of media assets. For example, the calculated score for the series, "Game of Thrones" may be 80 out of a possible 100, which the media guidance application may determine (e.g., via control circuitry 404 (FIG. 4)) results in "Game of Thrones" having the $4^{th}$ highest position on a ranked list for audience consistency.

In some embodiments, the media guidance application may calculate (e.g., via control circuitry 404 (FIG. 4)) the score for audience consistency of a second group of media assets, which may be done either in series or parallel with calculating the first group of media assets. The media guidance application may identify (e.g., via control circuitry 404 (FIG. 4)) a third subset of the plurality of user equipment, the third subset comprising each user equipment from which a third media asset was generated for display for a third threshold portion of a total duration of the third media asset. For example, the media guidance application may determine (e.g., via control circuitry 404 (FIG. 4)) from data packets received from user equipment that a subset of the user equipment generated for display an episode of "Friends." As discussed above, the media guidance application may then determine (e.g., via control circuitry 404 (FIG. 4)) whether each user equipment generated the episode of "Friends" for the threshold portion and if so add the specific identifier for the user equipment to a list of user equipment of the third subset. Alternatively or additionally, the media guidance application may increment (e.g., via control circuitry 404 (FIG. 4)) a counter for the total viewers of the third media asset.

The media guidance application may then identify (e.g., via control circuitry 404 (FIG. 4)) a fourth subset of the third subset, the fourth subset comprising each user equipment from which a fourth media asset, that is part of a second group of media assets including the third media asset, was generated for display for a fourth threshold portion of a total duration of the fourth media asset. For example, as discussed above, the media guidance application may determine (e.g., via control circuitry 404 (FIG. 4)) whether each user equipment on the list defining the third subset also generated for display another media asset that is part of a group of media assets including the third media asset (e.g., a different episode of the series "Friends). As discussed above, the media guidance application may add (e.g., via control circuitry 404 (FIG. 4)) the specific identifier to a list defining the fourth subset if the fourth media asset was generated for display the threshold portion of the total duration of the fourth media asset.

The media guidance application may then calculate (e.g., via control circuitry 404 (FIG. 4)) a score for audience consistency for the second group of media assets based on determining an amount of user equipment in the fourth subset. For example, as described with regards to calculating the score for audience consistency for the first group of media assets defined by the second subset, the number of user equipment in the fourth subset (e.g., 50,000) relative to the third subset (e.g., 500,000) may be used to calculate (e.g., via control circuitry 404 (FIG. 4)) a score for audience consistency by the media guidance application.

The media guidance application may then determine (e.g., via control circuitry 404 (FIG. 4)) whether the score for audience consistency for the second group of media assets is greater than the score for audience consistency for the first group of media assets. For example, the media guidance application may determine (e.g., via control circuitry 404 (FIG. 4)) that the score for "Game of Thrones" is 80 out of 100 and the score for "Friends" is 30 out of 100. In response to determining that the score for audience consistency for the second group of media assets is greater than the score for audience consistency for the first group of media assets, the media guidance application may rank (e.g., via control circuitry 404 (FIG. 4)) the second group of media assets higher than the first group of media assets among the plurality of ranked media assets. For example, because "Game of Thrones" has a higher audience consistency score than "Friends," the media guidance application may rank (e.g., via control circuitry 404 (FIG. 4)) "Game of Thrones" higher.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. For example, multiple instances of process 1000 may be executed such that multiple audience consistency scores for media assets and/or groups of media assets are calculated simultaneously. Furthermore, it should be noted that any of the devices or equipment discussed in relation to FIGS. 4-5 could be used to perform one or more of the steps in FIG. 10.

Figure 11:
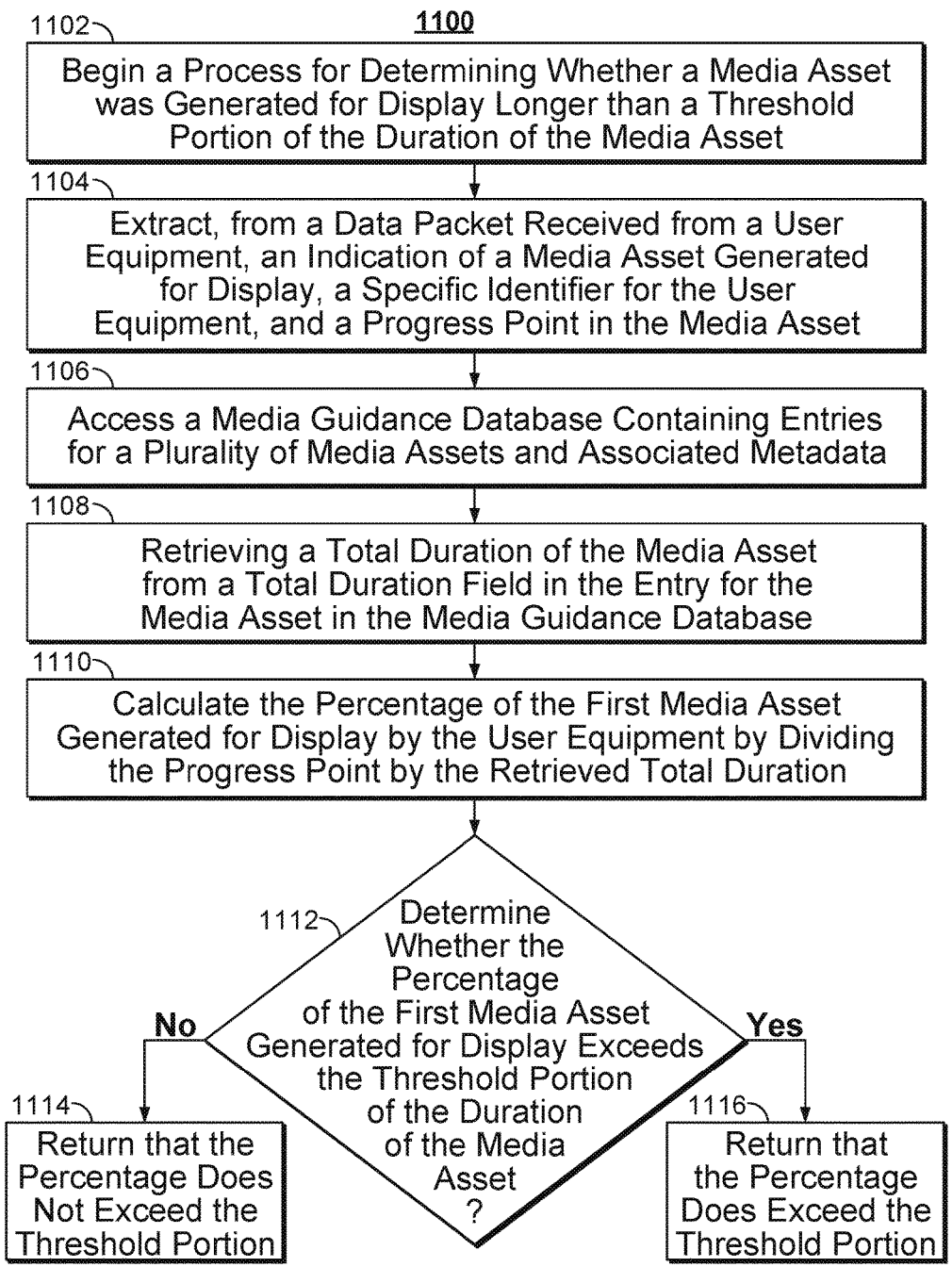
FIG. 11 is a flowchart of illustrative steps for determining whether a media asset was generated for display longer than a threshold, in accordance with some embodiments of the disclosure.

FIG. 11 is a flowchart of illustrative steps for determining whether a media asset was generated for display longer than a threshold, in accordance with some embodiments of the disclosure. For example, a media guidance application implementing process 1100 may be executed by control circuitry 404 (FIG. 4). It should be noted that process 1100 or any step thereof could be performed on, or provided by, any of the devices shown in FIGS. 4-5. Process 1100 starts with 1102, where the media guidance application begins a process for determining whether a media asset was generated for display longer than a threshold portion of the duration of the media asset. For example, the media guidance application may execute (e.g., via control circuitry 404 (FIG. 4)) a program script initializing process 1100.

Process 1100 continues to 1104, where the media guidance application extracts (e.g., via control circuitry 404 (FIG. 4)) from the data packet received (e.g., via communications network 514) from a user equipment (e.g., any of user equipment 502, 504, and 506), an indication of a media asset generated for display (e.g., on display 512), a specific identifier for the user equipment, and a progress point in the media asset. For example, the media guidance application may extract (e.g., via control circuitry 404 (FIG. 4), by executing an SQL script utilizing the declarative "Select" command, the specific identifier and the progress point from fields in a table transmitted in the data packet. The specific identifier may be any combination of alphanumeric characters. In some embodiments, the specific identifier may be unique to each user equipment (e.g., every user equipment has a different combination of alphanumeric characters). For example, the media guidance application may extract (e.g., via control circuitry 404 (FIG. 4) specific identifier, "STB_145950." In some embodiments, the specific identifier may be a user profile identifier for an account with a content provider. For example, the media guidance application may extract a user profile identifier (e.g., "BOB_123") from a data packet received from a user equipment generating for display an OTT content source (e.g., HULU or other OTT content sources discussed in relation to FIG. 5) and use the user profile identifier as the specific identifier of user equipment. In some embodiments, the specific identifier may be the same for multiple user equipment used by the same user (e.g., a user profile identifier). In this way, the media guidance application may determine that the same user is viewing a media asset that is part of a group of media assets even if the user is viewing the media asset on a different device (e.g., one episode viewed on a mobile phone and another viewed on a set-top box).

The media guidance application may determine the progress point by extracting (e.g., via control circuitry 404 (FIG. 4) and comparing fields in the table for start time and end time that a program was generated for display. As a specific example, the media guidance application may extract (e.g., via control circuitry 404 (FIG. 4) that an episode of a series (e.g., "And Now His Watch Is Ended") was generated for display from 21:00 to 21:45. The media guidance application may subtract (e.g., via control circuitry 404 (FIG. 4) the start value from the end value and determine the progress point as 45 minutes of the episode, because that is the length that was generated for display.

Process 1100 continues to 1106, where the media guidance application accesses (e.g., via control circuitry 404 (FIG. 4)) a media guidance database containing entries for a plurality of media assets and associated metadata. For example, the media guidance application may access (e.g., via control circuitry 404 (FIG. 4)) the media guidance database (e.g., media guidance data source 518 (FIG. 5)) via a communications network (e.g., communications network 514 (FIG. 5)). The media guidance database may be organized as a table where each entry is specific to a media asset and each field of the entry contains metadata relating to the media asset.

Process 1100 continues to 1108, where the media guidance application retrieves (e.g., via control circuitry 404 (FIG. 4)) a total duration of the media asset from a total duration field in the entry for the media asset in the media guidance database. For example, the media guidance application may retrieve (e.g., via control circuitry 404 (FIG. 4)), by executing an SQL script utilizing the declarative "Select" command, a value for the total duration of the media asset from a total duration field (e.g., 90 minutes).

Process 1100 continues to 1110, where the media guidance application calculates (e.g., via control circuitry 404 (FIG. 4)) the percentage of the first media asset generated for display by the user equipment by dividing the progress point by the retrieved total duration. For example, the media guidance application may determine (e.g., via control circuitry 404 (FIG. 4)) the percentage as 75% of the media asset that has been generated for display by the user equipment based on dividing the progress point (e.g., 45 minutes) by the total duration retrieved from the total duration field (e.g., 60 minutes). In some embodiments, the media guidance application may store (e.g., either locally in storage 808 or remotely at media guidance data source 918), in an entry of a viewing history database for the user equipment device identified by the specific identifier, the percentage of the first media asset generated for display. For example, the media guidance application may store the value for the percentage in a field of the viewing history data structure for the user equipment (e.g., as discussed in relation to FIG. 6).

Process 1100 continues to 1112, where the media guidance application determines (e.g., via control circuitry 404 (FIG. 4)) whether the percentage of the first media asset generated for display exceeds the threshold portion of the duration of the media asset. For example, the media guidance application may compare (e.g., via control circuitry 404 (FIG. 4)) the percentage (e.g., 75%) with a threshold portion (e.g., determined based on the content of the media asset as described further in FIG. 14 below). The media guidance application may modify (e.g., via control circuitry 404 (FIG. 4)) the units of the threshold portion such that the units are in percentage units in order to facilitate the comparison.

If, at 1112, the media guidance application determines that the percentage exceeds the threshold portion, process 1100 continues to 1116, where the media guidance application returns (e.g., via control circuitry 404 (FIG. 4) that the percentage does exceed the threshold portion. For example, the media guidance application may return (e.g., via control circuitry 404 (FIG. 4) a boolean set to true if the percentage exceeds the threshold portion. Alternatively, if, at 1112, the media guidance application determines that the percentage does not exceed the threshold portion, process 1100 continues to 1114, where the media guidance application returns (e.g., via control circuitry 404 (FIG. 4) that the percentage does not exceed the threshold portion. For example, the media guidance application may return (e.g., via control circuitry 404 (FIG. 4) a boolean set to false if the percentage does not exceed the threshold portion.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIG. 11.

Figure 12:
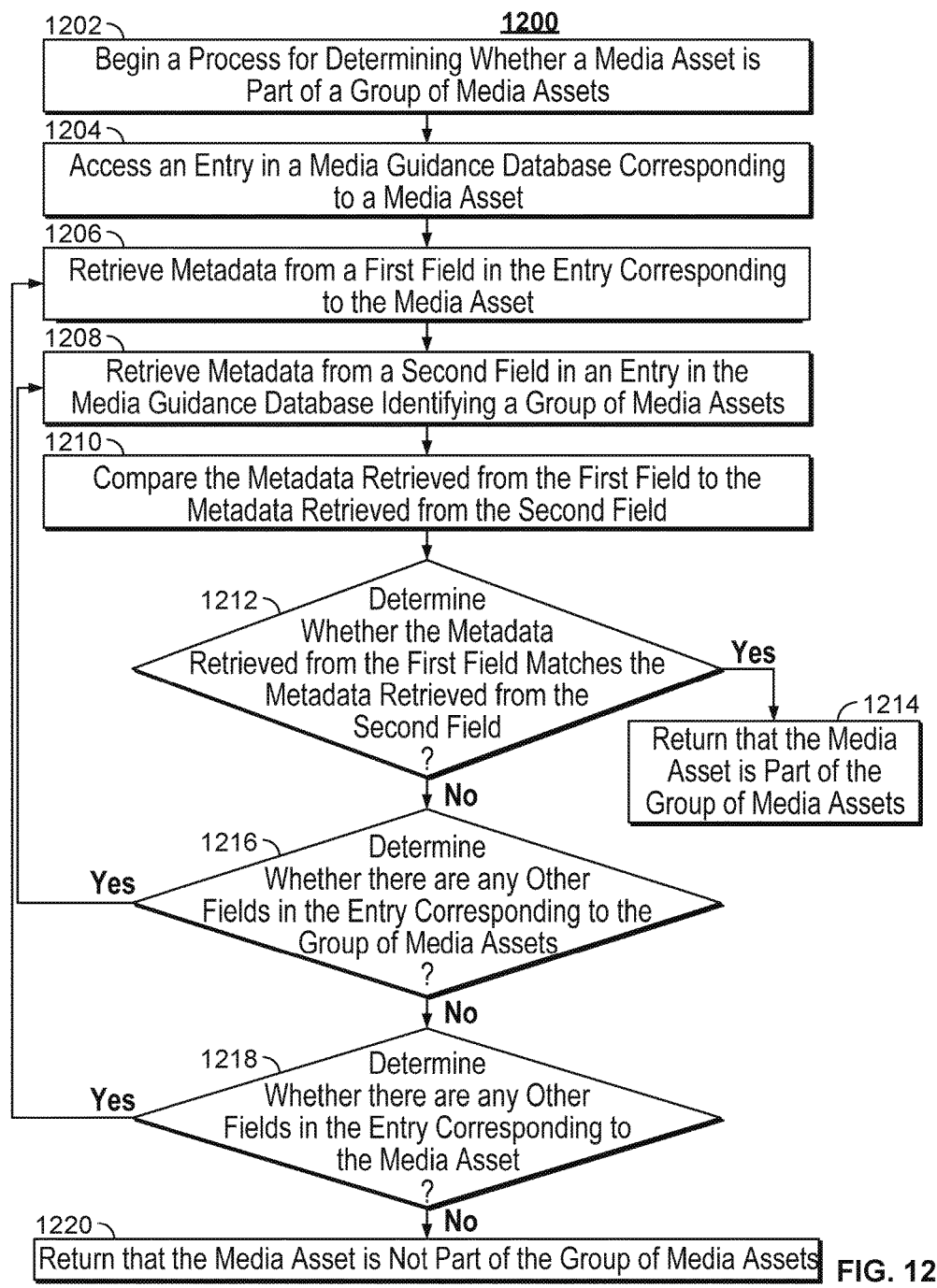
FIG. 12 is a flowchart of illustrative steps for determining whether a media asset is part of a group of media assets, in accordance with some embodiments of the disclosure.

FIG. 12 is a flowchart of illustrative steps for determining whether a media asset is part of a group of media assets, in accordance with some embodiments of the disclosure. For example, a media guidance application implementing process 1200 may be executed by control circuitry 404 (FIG. 4). It should be noted that process 1200 or any step thereof could be performed on, or provided by, any of the devices or equipment shown in FIGS. 4-5. Process 1200 starts with 1202, where the media guidance application begins a process for determining whether a media asset is part of a group of media assets. For example, the media guidance application may execute (e.g., via control circuitry 404 (FIG. 4)) a program script initializing process 1200.

Process 1200 continues to 1204, where the media guidance application accesses (e.g., via control circuitry 404 (FIG. 4)) an entry in a media guidance database corresponding to the media asset. For example, the media guidance application may access (e.g., via control circuitry 404 (FIG. 4)) the media guidance database (e.g., media guidance data source 518 (FIG. 5)) via a communications network (e.g., communications network 514 (FIG. 5)), as described above in process 1100.

Process 1200 continues to 1206, where the media guidance application retrieves (e.g., via control circuitry 404 (FIG. 4)) metadata from a first field in the entry corresponding to the media asset. For example, the media guidance application may retrieve (e.g., via control circuitry 404 (FIG. 4)), by executing an SQL script utilizing the declarative "Select" command, metadata from a field in the entry corresponding to the media asset.

Process 1200 continues to 1208, where the media guidance application retrieves (e.g., via control circuitry 404 (FIG. 4)) metadata from a second field in an entry in the media guidance database identifying a group of media assets. For example, the media guidance application may retrieve (e.g., via control circuitry 404 (FIG. 4)), by executing an SQL script utilizing the declarative "Select" command, metadata from the second field. In some embodiments, the entry identifying a group of media assets may be in a separate data structure linked (e.g., via a pointer) to the media guidance database. In other embodiments, the media guidance database may be organized as a self-referential table, where entries corresponding to media assets are contained non-contiguously in a single table and linked to associated entries (e.g., via pointers).

Process 1200 continues to 1210, where the media guidance application compares (e.g., via control circuitry 404 (FIG. 4)) the metadata retrieved from the first field to the metadata retrieved from the second field. For example, the entry in the media guidance database for the media asset may include a group of media assets flag stored in a field, set to true if the media asset is part of a group of media assets, and another field identifying the group of media assets (e.g., the string, "Game of Thrones"). Alternatively, the media guidance application may compare (e.g., via control circuitry 404 (FIG. 4)) metadata from the entry for the media asset (e.g., an actor) with metadata in other entries to determine if the first media asset and another media asset is part of a group of media assets. The media guidance application may execute (e.g., via control circuitry 404 (FIG. 4)) a program script to compare the characters of the retrieved metadata to determine whether there is a match.

Process 1200 continues to 1212, where the media guidance application determines (e.g., via control circuitry 404

(FIG. 4)) whether the metadata retrieved from the first field matches the metadata retrieved from the second field. For example, as discussed above, the media guidance application may execute (e.g., via control circuitry 404 (FIG. 4)) a program script to compare characters of the retrieved metadata (e.g., strings). In some embodiments, the media guidance application may determine (e.g., via control circuitry 404 (FIG. 4)) a match if the metadata matches within a tolerance factor (e.g., one character is different). In other embodiments, the media guidance application may determine (e.g., via control circuitry 404 (FIG. 4)) a match only if every character matches.

If, at 1212, the media guidance application determines the metadata retrieved from the first field matches the metadata retrieved from the second field, process 1200 continues to 1214, where the media guidance application returns (e.g., via control circuitry 404 (FIG. 4)) that the media asset is part of the group of media assets. For example, a program script executed by the media guidance application may return an identifier of the group of media assets that the media asset is part of and terminate.

If, at 1212, the media guidance application determines the metadata retrieved from the first field does not match the metadata retrieved from the second field, process 1200 continues to 1216, where the media guidance application determines whether there are any other fields in the entry corresponding to the group of media assets. For example, the media guidance application may execute (e.g., via control circuitry 404 (FIG. 4)) a program script that utilizes a for-loop to iteratively retrieve each field in the entry for the group of media assets.

If, at 1216, the media guidance application determines there is another field in the entry corresponding to the group of media assets, process 1200 returns to 1208 and retrieves the metadata from the field. For example, the media guidance application may determine (e.g., via control circuitry 404 (FIG. 4)) whether a different field in the entry contains metadata that relates to groups of media assets. As a specific example, the media guidance application may retrieve (e.g., via control circuitry 404 (FIG. 4)) from another field in the entry for the group of media assets a string corresponding to an actor associated with the group. The media guidance application may retrieve (e.g., via control circuitry 404 (FIG. 4)) and compare specific fields in the media guidance database when searching for whether a media asset is part of a group based on parameters set for what defines a group of media assets in the model for audience consistency, as discussed above. This approach may be helpful for promotional content providers who want to target consistent audiences (i.e., that regularly view) during certain time slots, who view shows starring certain actors, etc.

If, at 1216, the media guidance application determines there is not another field in the entry corresponding to the group of media assets, process 1200 continues to 1218 and determines whether there are any other fields in the entry corresponding to the media asset. Similar to the above for the entry for groups of media assets, the media guidance application may execute (e.g., via control circuitry 404 (FIG. 4)) a program script that utilizes a for-loop to iteratively retrieve each field in the entry for the media asset.

If, at 1218, the media guidance application determines there is another field in the entry corresponding to the group of media assets, process 1200 returns to 1206 and retrieves the metadata from the field. For example, the media guidance application may determine (e.g., via control circuitry 404 (FIG. 4)) whether a different field in the entry contains metadata that relates to groups of media assets, as described above, based on comparing with metadata from the entry for groups of media assets. In this way, the media guidance application iteratively compares (e.g., via control circuitry 404 (FIG. 4)) each field in both entries and determines whether the media asset is a member of a group of media assets (e.g., based on a rule-set defining a group of media assets which can be adjusted as discussed).

If, at 1218, the media guidance application determines there is another field in the entry corresponding to the group of media assets, process 1200 returns to 1220 and returns (e.g., via control circuitry 404 (FIG. 4)) that the media asset is not part of the group of media assets. For example, the media guidance application may return (e.g., via control circuitry 404 (FIG. 4)) a boolean value set to false.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. For example, multiple instances of process 1200 may be executed such that a media asset is compared to multiple different groups of media assets simultaneously. Furthermore, it should be noted that any of the devices or equipment discussed in relation to FIGS. 4-5 could be used to perform one or more of the steps in FIG. 12.

Figure 13:
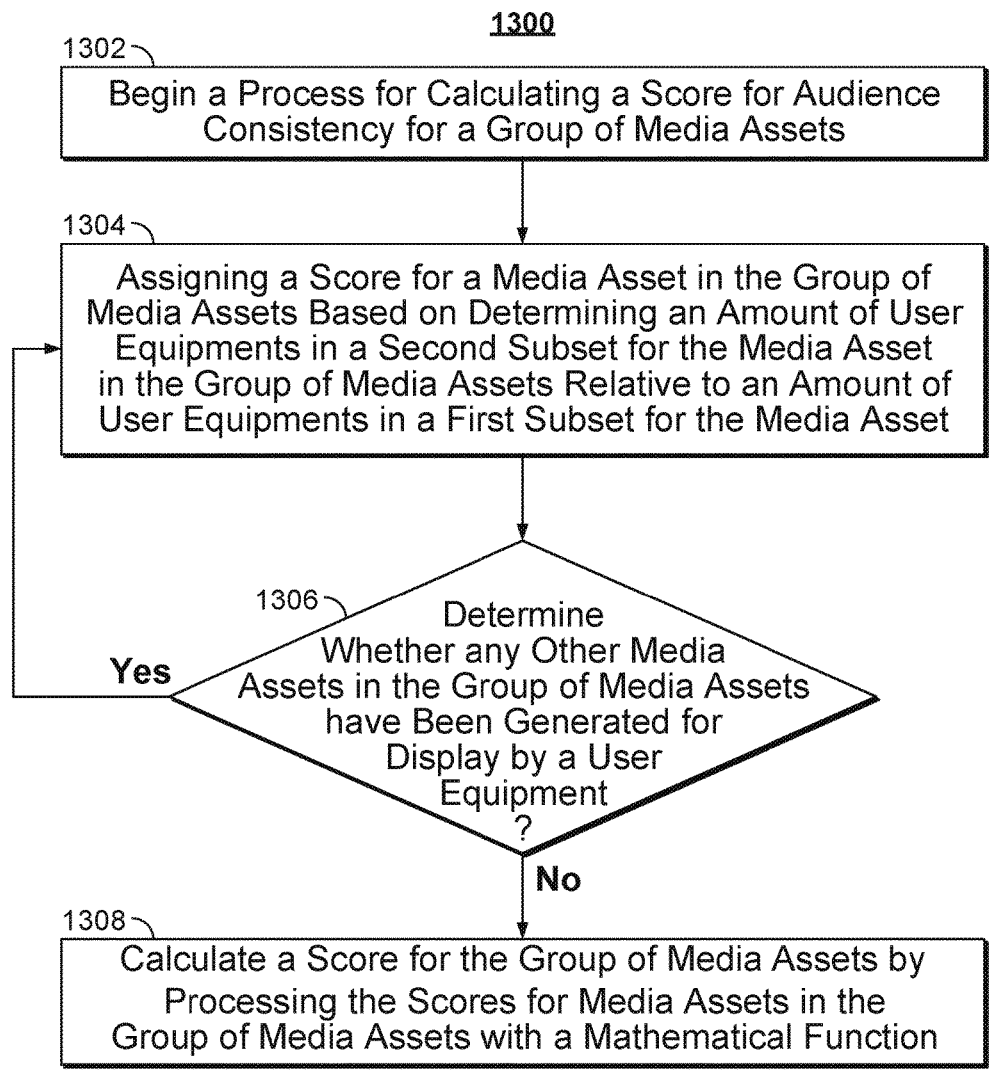
FIG. 13 is a flowchart of illustrative steps for calculating a score for audience consistency for a group of media assets, in accordance with some embodiments of the disclosure.

FIG. 13 is a flowchart of illustrative steps for calculating a score for audience consistency for a group of media assets, in accordance with some embodiments of the disclosure. For example, a media guidance application implementing process 1300 may be executed by control circuitry 404 (FIG. 4). It should be noted that process 1300 or any step thereof could be performed on, or provided by, any of the devices or equipment shown in FIGS. 4-5. Process 1300 starts with 1302, where the media guidance application begins a process for calculating a score for audience consistency for a group of media assets. For example, the media guidance application may execute (e.g., via control circuitry 404 (FIG. 4)) a program script initializing process 1300.

Process 1300 continues to 1304, where the media guidance application assigns (e.g., via control circuitry 404 (FIG. 4)) a score for a media asset in the group of media assets based on determining an amount of user equipment in a second subset for the media asset in the group of media assets relative to an amount of user equipment in a first subset for the media asset. As discussed in relation to FIG. 10, the media guidance application assigns (e.g., via control circuitry 404 (FIG. 4)) a score for audience consistency for a group of media assets based on the score for a media asset that is a part of the group of media assets. For example, the media guidance application may determine (e.g., via control circuitry 404 (FIG. 4)) how many user equipment identifiers are present on the list defining the second subset. As a specific example, the media guidance application may determine (e.g., via control circuitry 404 (FIG. 4)) that 100,000 user equipment are part of the second subset (e.g., the user equipment generated multiple episodes of a series for display). The media guidance application may also determine (e.g., via control circuitry 404 (FIG. 4)) the total number of user equipment that generated the first media asset for display the threshold portion (e.g., the first subset). The media guidance application may input (e.g., via control circuitry 404 (FIG. 4)) the absolute number of total user equipment that viewed the first media asset (e.g., 300,000), absolute number of user equipment that generated another media asset for display in addition to the first media asset (e.g., 100,000), as well as the percentage (e.g., 33%) into a mathematical function to determine the score for the particular media asset.

Process 1300 continues to 1306, where the media guidance application determines (e.g., via control circuitry 404 (FIG. 4)) whether any other media assets in the group of media assets have been generated for display by a user equipment. For example, the media guidance application may iterate (e.g., via control circuitry 404 (FIG. 4)) through each user equipment in an index viewing history data structure and determine whether each user equipment generated for display a media asset that is part of the group of media assets.

If, at 1306, the media guidance application determines another media asset in the group of media assets has been generated for display by a user equipment, process 1300 returns to 1304, where the media guidance application assigns (e.g., via control circuitry 404 (FIG. 4)) a score for the media asset. For example, as described above, the media guidance application may calculate (e.g., via control circuitry 404 (FIG. 4)) a score for audience consistency for the media asset. The media guidance application, by iterating through and assigning values to each media asset in the group of media assets calculates (e.g., via control circuitry 404 (FIG. 4)) a more representative value of how users are viewing the group of media assets than if the media guidance application only uses a subset of the media assets to calculate the audience consistency score for the group of media assets.

If, at 1306, the media guidance application determines no other media asset in the group of media assets has been generated for display by a user equipment, process 1300 continues to 1308, where the media guidance application calculates (e.g., via control circuitry 404 (FIG. 4)) a score for the group of media assets by processing the scores for media assets in the group of media assets with a mathematical function. For example, as described above, the media guidance application may average the scores of each media asset for which a score is available when determining the audience consistency score for a group of media assets.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. For example, multiple instances of process 1300 may be executed such that the audience consistency score for media assets that are part of a group are calculated simultaneously. Furthermore, it should be noted that any of the devices or equipment discussed in relation to FIGS. 4-5 could be used to perform one or more of the steps in FIG. 13.

Figure 14:
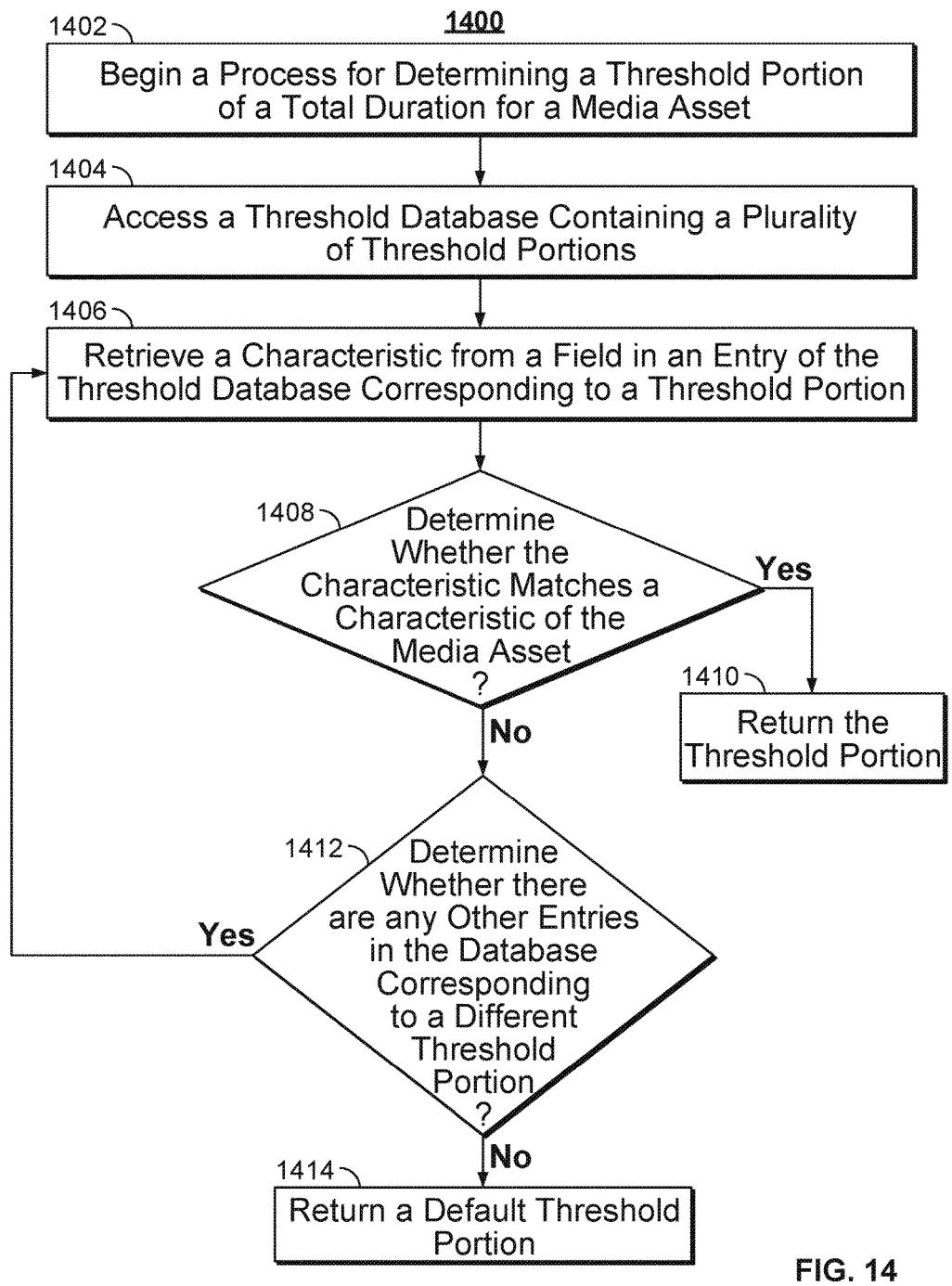
FIG. 14 is a flowchart of illustrative steps for determining a threshold portion corresponding to a media asset, in accordance with some embodiments of the disclosure.

FIG. 14 is a flowchart of illustrative steps for calculating a score for determining a threshold portion corresponding to a media asset, in accordance with some embodiments of the disclosure. For example, a media guidance application implementing process 1400 may be executed by control circuitry 404 (FIG. 4). It should be noted that process 1400 or any step thereof could be performed on, or provided by, any of the devices or equipment shown in FIGS. 4-5. Process 1400 starts with 1402, where the media guidance application begins a process for determining a threshold portion of a total duration for a media asset. For example, the media guidance application may execute (e.g., via control circuitry 404 (FIG. 4)) a program script initializing process 1400.

Process 1400 continues to 1404, where the media guidance application accesses (e.g., via control circuitry 404 (FIG. 4)) a threshold database containing a plurality of threshold portions. For example, the media guidance application may access (e.g., via control circuitry 404 (FIG. 4)) the threshold database (e.g., media guidance data source 518 (FIG. 5)) via a communications network (e.g., communications network 514 (FIG. 5)). The threshold database may be organized as a table where each entry is specific to a media asset or a category of media asset (e.g., genre) and a field of the entry contains the value for the threshold. In some embodiments, the threshold portion may be incorporated as a field in the media guidance database for each media asset.

Process 1400 continues to 1406, where the media guidance application retrieves (e.g., via control circuitry 404 (FIG. 4)) a characteristic from a field in an entry of the threshold database corresponding to a threshold portion. For example, in the threshold database an entry for a threshold value for the genre "action" may include a plurality of metadata in fields of the entry (e.g., the keyword "car chase") that may be compared to characteristics of the media asset. The media guidance application may retrieve (e.g., via control circuitry 404 (FIG. 4)) one of these characteristics (e.g., by executing an SQL script utilizing the declarative "Select" command).

Process 1400 continues to 1408, where the media guidance application determines (e.g., via control circuitry 404 (FIG. 4)) whether the retrieved characteristic matches a characteristic of the media asset. For example, the media guidance application may compare (e.g., via control circuitry 404 (FIG. 4)) characters from the retrieved characteristic (e.g., "car chase") to characters of a characteristic (e.g., metadata) relating to the media asset (e.g., stored in an entry of a media guidance database as discussed above in FIG. 12). If the characters of the retrieved characteristic match characters of metadata relating to the media asset, the media guidance application may determine (e.g., via control circuitry 404 (FIG. 4)) that there is a match.

If, at 1408, the media guidance application determines that the retrieved characteristic does match a characteristic of the media asset, process 1400 continues to 1410, where the media guidance application returns (e.g., via control circuitry 404 (FIG. 4)) the threshold portion. For example, in response to determining the threshold portion in the threshold database matches characteristics of the media asset, the media guidance application may return (e.g., via control circuitry 404 (FIG. 4)) the value stored in the entry of the database (e.g., determined to match characteristics of the media asset) for the threshold portion of the total duration of the media asset (e.g., for the media guidance application to use during step 1012 of FIG. 10).

If, at 1408, the media guidance application determines that the retrieved characteristic does not match a characteristic of the media asset, process 1400 continues to 1412, where the media guidance application determines (e.g., via control circuitry 404 (FIG. 4)) whether there are any other entries in the database corresponding to a different threshold portion. For example, the media guidance application may execute (e.g., via control circuitry 404 (FIG. 4)) a program script utilizing a for-loop to iteratively retrieve and compare characteristics of different threshold portions in the threshold database to characteristics of the media asset. If, at 1412, the media guidance application determines there is another entry in the database corresponding to a different threshold portion, process 1400 returns to 1406, where the media guidance application retrieves (e.g., via control circuitry 404 (FIG. 4)) a characteristic from a field in the entry of the threshold database corresponding to the threshold portion. For example, in response to determining that a first threshold does not correspond to the media asset based on the characteristics not matching, the media guidance application may retrieve (e.g., via control circuitry 404 (FIG. 4)) characteristics of another threshold portion and continue iterating through the list of threshold portions until a match is found.

If, at 1412, the media guidance application determines there are no other entries in the database corresponding to a different threshold portion, process 1400 continues to 1414, where the media guidance application returns (e.g., via control circuitry 404 (FIG. 4)) a default threshold portion. For example, in response to determining that no threshold portion in the threshold database matches characteristics of the media asset, the media guidance application may return (e.g., via control circuitry 404 (FIG. 4)) a default threshold portion (e.g., for the media guidance application to use during step 1012 of FIG. 10).

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIG. 14.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for modeling consistency of audiences viewing groups of media assets, the method comprising:
   receiving a data packet from a user equipment of a plurality of user equipment;
   extracting, from the data packet, an indication of a first media asset;
   identifying a first subset of the plurality of user equipment, the first subset comprising each user equipment on which the first media asset was generated for display;
   identifying a second subset of the first subset, the second subset comprising each user equipment on which a second media asset was generated for display, wherein the first media asset and the second media asset are part of a group of media assets;
   calculating a score for audience consistency for the group of media assets based on the number of user equipment in the second subset comprising each user equipment on which the first media asset and the second media asset were generated for display relative to the number of user equipment in the first subset comprising each user equipment on which the first media asset was generated for display;
   ranking the group of media assets among a plurality of groups of media assets based on the calculated score for audience consistency for the group of media assets; and
   selecting a group of the plurality of groups of media assets with the highest rank to target with an advertisement.

2. The method of claim 1, wherein the group of media assets is a first group of media assets, further comprising:
   identifying a third subset of the plurality of user equipment, the third subset comprising each user equipment on which a third media asset was generated for display;
   identifying a fourth subset of the third subset, the fourth subset comprising each user equipment on which a fourth media asset was generated for display, wherein the third media asset and the fourth media asset are part of a second group of media assets;
   calculating a score for audience consistency for the second group of media assets based on the number of user equipment in the fourth subset;
   determining whether the score for audience consistency for the second group of media assets is greater than the score for audience consistency for the first group of media assets; and
   in response to determining the score for audience consistency for the second group of media assets is greater than the score for audience consistency for the first group of media assets, ranking the second group of media assets higher than the first group of media assets among the plurality of ranked media assets.

3. The method of claim 1, wherein calculating the score for audience consistency for the group of media assets based on determining the number of user equipment in the second subset comprises:
   determining a score for each media asset in the group of media assets;
   calculating an average score by averaging the score for each media asset in the group of media assets; and
   mapping the average score to the score for audience consistency for the group of media assets by processing the average score with a first mathematical function.

4. The method of claim 3, further comprising:
   calculating variance for the group of media assets by summing the difference squared between the score for each media asset in the group and the average score; and
   mapping the variance to the score for audience consistency for the group of media assets by processing the variance with a second mathematical function.

5. The method of claim 1, wherein the group of media assets is a series, wherein the first media asset is a second episode, wherein the second media asset is a first episode, wherein the first episode is transmitted at an earlier time than the second episode, and wherein calculating the score for audience consistency for the group of media assets based on determining the number of user equipment in the second subset comprises:
   retrieving a first score for the first episode of the series and a second score for the second episode of the series;
   determining whether the first score is greater than the second score; and
   in response to determining the first score is greater than the second score, decreasing the score for audience consistency for the series.

6. The method of claim 1, further comprising:
extracting, from the data packet from the user equipment, a progress point and a specific identifier for the user equipment;
retrieving, from a media guidance database, the total duration of the first media asset;
calculating a percentage of the first media asset generated for display by the user equipment by dividing the progress point by the retrieved total duration; and
storing, in an entry of a viewing history database for the user equipment device identified by the specific identifier, the percentage of the first media asset generated for display.

7. The method of claim 1, wherein identifying-the second subset of the first subset comprises:
accessing an entry in a media guidance database corresponding to the first media asset;
comparing metadata in the entry with metadata identifying groups of media assets;
determining, based on comparing the metadata in the entry with the metadata identifying the groups of media assets, that the first media asset is part of the group of media assets; and
determining, based on an entry in the media guidance database corresponding to the group of media assets, that the second media asset is part of the group of media assets.

8. The method of claim 1, wherein calculating the score for audience consistency for the group of media assets based on determining the number of user equipment in the second subset comprises:
identifying a third subset of the second subset, the third subset comprising each user equipment on which a third media asset was generated for display, wherein the third media asset is part of the group of media assets;
determining the number of user equipment in the third subset; and
adjusting the score for the group of media assets based on a weight for each of the number of user equipment in the third subset.

9. The method of claim 1, wherein identifying the first subset of the plurality of user equipment comprises:
accessing a threshold database containing a plurality of threshold portions;
comparing a characteristic of the first media asset with characteristics of the plurality of threshold portions to identify a first threshold portion that corresponds to the first media asset; and
retrieving the first threshold portion that corresponds to the first media asset.

10. The method of claim 1, further comprising:
generating for display a plurality of selectable options to adjust the score for audience consistency;
receiving a user selection of an option of the plurality of selectable options;
modifying the score for audience consistency for each group of media assets of the plurality of groups of media assets based on the user selection; and
ranking the plurality of groups of media assets based on the modified score for audience consistency for each group of media assets.

11. A system for modeling consistency of audiences viewing groups of media assets, the system comprising:
control circuitry configured to:
receive a data packet from a user equipment of a plurality of user equipment;
extract, from the data packet, an indication of a first media asset;
identify a first subset of the plurality of user equipment, the first subset comprising each user equipment on which the first media asset was generated for display;
identify a second subset of the first subset, the second subset comprising each user equipment on which a second media asset was generated for display, wherein the first media asset and the second media asset are part of a group of media assets;
calculate a score for audience consistency for the group of media assets based on the number of user equipment in the second subset comprising each user equipment on which the first media asset and the second media asset were generated for display relative to the number of user equipment in the first subset comprising each user equipment on which the first media asset was generated for display;
rank the group of media assets among a plurality of groups of media assets based on the calculated score for audience consistency for the group of media assets; and
select a group of the plurality of groups of media assets with the highest rank to target with an advertisement.

12. The system of claim 11, wherein the group of media assets is a first group of media assets, and wherein the control circuitry is further configured to:
identify a third subset of the plurality of user equipment, the third subset comprising each user equipment on which a third media asset was generated for display;
identify a fourth subset of the third subset, the fourth subset comprising each user equipment on which a fourth media asset was generated for display, wherein the third media asset and the fourth media asset are part of a second group of media assets;
calculate a score for audience consistency for the second group of media assets based on the number of user equipment in the fourth subset;
determine whether the score for audience consistency for the second group of media assets is greater than the score for audience consistency for the first group of media assets; and
in response to determining the score for audience consistency for the second group of media assets is greater than the score for audience consistency for the first group of media assets, rank the second group of media assets higher than the first group of media assets among the plurality of ranked media assets.

13. The system of claim 11, wherein the control circuitry is further configured, when calculating the score for audience consistency for the group of media assets based on determining the number of user equipment in the second subset, to:
determine a score for each media asset in the group of media assets;
calculate an average score by averaging the score for each media asset in the group of media assets; and
map the average score to the score for audience consistency for the group of media assets by processing the average score with a first mathematical function.

14. The system of claim 13, wherein the control circuitry is further configured to:
calculate variance for the group of media assets by summing the difference squared between the score for each media asset in the group and the average score; and map the variance to the score for audience consistency for the group of media assets by processing the variance with a second mathematical function.

15. The system of claim 11, wherein the group of media assets is a series, wherein the first media asset is a second episode, wherein the second media asset is a first episode, wherein the first episode is transmitted at an earlier time than the second episode, and wherein the control circuitry is further configured, when calculating the score for audience consistency for the group of media assets based on determining the number of user equipment in the second subset, to:
retrieve a first score for the first episode of the series and a second score for the second episode of the series;
determine whether the first score is greater than the second score; and
in response to determining the first score is greater than the second score, decrease the score for audience consistency for the series.

16. The system of claim 11, wherein the control circuitry is further configured to:
extract, from the data packet from the user equipment, a progress point and a specific identifier for the user equipment;
retrieve, from a media guidance database, the total duration of the first media asset;
calculate a percentage of the first media asset generated for display by the user equipment by dividing the progress point by the retrieved total duration; and
store, in an entry of a viewing history database for the user equipment device identified by the specific identifier, the percentage of the first media asset generated for display.

17. The system of claim 11, wherein the control circuitry is further configured, when identifying the second subset of the first subset, to:
access an entry in a media guidance database corresponding to the first media asset;
compare metadata in the entry with metadata identifying groups of media assets;
determine, based on comparing the metadata in the entry with the metadata identifying the groups of media assets, that the first media asset is part of the group of media assets; and
determine, based on an entry in the media guidance database corresponding to the group of media assets, that the second media asset is part of the group of media assets.

18. The system of claim 11, wherein the control circuitry is further configured, when calculating the score for audience consistency for the group of media assets based on determining the number of user equipment in the second subset, to:
identify a third subset of the second subset, the third subset comprising each user equipment on which a third media asset was generated for display, wherein the third media asset is part of the group of media assets;
determining the number of user equipment in the third subset; and
adjust the score for the group of media assets based on a weight for each of the number of user equipment in the third subset.

19. The system of claim 11, wherein the control circuitry is further configured, when identifying the first subset of the plurality of user equipment, to:
access a threshold database containing a plurality of threshold portions;
compare a characteristic of the first media asset with characteristics of the plurality of threshold portions to identify a first threshold portion that corresponds to the first media asset; and
retrieve the first threshold portion that corresponds to the first media asset.

20. The system of claim 11, wherein the control circuitry is further configured to:
generate for display a plurality of selectable options to adjust the score for audience consistency;
receive a user selection of an option of the plurality of selectable options;
modify the score for audience consistency for each group of media assets of the plurality of groups of media assets based on the user selection; and
rank the plurality of groups of media assets based on the modified score for audience consistency for each group of media assets.

* * * * *